(12) United States Patent
Roeder et al.

(10) Patent No.: US 11,444,892 B2
(45) Date of Patent: *Sep. 13, 2022

(54) ENHANCING PERFORMANCE OF MESSAGE SEARCH AND RETRIEVAL

(71) Applicant: Dropbox, Inc., San Francisco, CA (US)

(72) Inventors: Michael Roeder, Oakland, CA (US); Sean Beausoleil, Mountain View, CA (US); Veronica Zheng, Pittsburgh, PA (US)

(73) Assignee: Dropbox, Inc., San Francisco, CA (US)

( * ) Notice: Subject to any disclaimer, the term of this patent is extended or adjusted under 35 U.S.C. 154(b) by 441 days.

This patent is subject to a terminal disclaimer.

(21) Appl. No.: 16/012,005

(22) Filed: Jun. 19, 2018

(65) Prior Publication Data

US 2018/0302344 A1  Oct. 18, 2018

Related U.S. Application Data

(63) Continuation of application No. 14/157,439, filed on Jan. 16, 2014, now Pat. No. 10,033,668.

(51) Int. Cl.
| | |
|---|---|
| *G06F 16/28* | (2019.01) |
| *G06F 16/44* | (2019.01) |
| *H04L 51/00* | (2022.01) |
| *H04L 51/216* | (2022.01) |

(52) U.S. Cl.
CPC ............ *H04L 51/00* (2013.01); *G06F 16/285* (2019.01); *G06F 16/444* (2019.01); *H04L 51/216* (2022.05)

(58) Field of Classification Search
CPC ......... H04L 51/16; H04L 51/22; H04L 51/18; H04L 51/08; H04L 51/21; H04L 51/00; G06F 16/2228; G06F 16/248; G06F 16/285; G06F 16/444; G06F 16/9024; G06F 3/04842
See application file for complete search history.

(56) References Cited

U.S. PATENT DOCUMENTS

| | | | |
|---|---|---|---|
| 5,944,780 A | 8/1999 | Chase et al. | |
| 6,560,318 B1 | 5/2003 | Spielman et al. | |
| 7,412,437 B2 | 8/2008 | Moody et al. | |
| 7,529,803 B2 | 5/2009 | Levi et al. | |
| 7,945,683 B1 * | 5/2011 | Ambrose | G06F 16/9574 709/228 |
| 8,131,832 B1 | 3/2012 | Hood et al. | |
| 8,156,135 B2 | 4/2012 | Chi et al. | |
| 2005/0076024 A1 * | 4/2005 | Takatsuka | G06F 16/20 707/999.003 |
| 2007/0208704 A1 | 9/2007 | Ives | |
| 2008/0033918 A1 * | 2/2008 | Wilson | G06F 16/951 707/999.003 |

(Continued)

*Primary Examiner* — Yuk Ting Choi
(74) *Attorney, Agent, or Firm* — DLA Piper LLP (US)

(57) ABSTRACT

A message management service can enable a client to search and retrieve of messages from one or more messaging services. The message management service can stage delivery of results to the client to reduce response time for identification of messages satisfying a query. Initially, the message management service can send information descriptive of results, which the client can display. The message management service can send subsequent responses including supplemental information associated with a result and/or actual messages.

19 Claims, 12 Drawing Sheets

(56) References Cited

U.S. PATENT DOCUMENTS

| | | | |
|---|---|---|---|
| 2008/0270548 A1* | 10/2008 | Glickstein | G06Q 10/107 709/206 |
| 2009/0276732 A1* | 11/2009 | Dervan | G06Q 10/107 715/853 |
| 2010/0318541 A1 | 12/2010 | Golwalkar et al. | |
| 2013/0218896 A1* | 8/2013 | Palay | H04L 51/16 707/741 |
| 2013/0246390 A1 | 9/2013 | Wable et al. | |
| 2015/0113076 A1* | 4/2015 | Dubie | H04L 51/16 709/206 |
| 2015/0199440 A1 | 7/2015 | Roeder et al. | |

* cited by examiner

610 — Q Brett

620 — John Doe   6:24 PM
Rehearsal Tomorrow
Don't forget Brett. We have band rehearsal tmrw at 6

622 — Brett & Me   5:11 PM
Your firm's Seattle office CLE's?
Great. Thanks, Tyler!

624 — Me & Shelley   8:33 AM
Hi Brett
Great seeing you too! Hopefully, I can convince Mark and Dave to se...

626 — acme.com Ticketing   Sept 28
Plan to see the Bears play the...
Brett, Here is your acme.com Ticket Guide! Sept 10, 2013 View as a web page....

628 — Jane Smith   Sept 25
Thank you for your...
Hi Brett, Your donation to the San Francisco Good Cause has been...

630 — Show More Results

Q Brett

630 — John Doe   6:24 PM   ⌃
Rehearsal Tomorrow   [4]
Don't forget Brett. We have band rehearsal tmrw at 6

632 — Brett & Me   5:11 PM   ⌃
Your firm's Seattle office CLE's?
Great. Thanks, Tyler!

634 — Me & Shelley   8:33 AM   ⌃
Hi Brett   [3]
Great seeing you too! Hopefully, I can convince Mark and Dave to se...

636 — acme.com Ticketing   Sept 28   ⌃
Plan to see the Bears play the...
Brett, Here is your acme.com Ticket Guide! Sept 10, 2013 View as a web page....

638 — Jane Smith   Sept 25   ⌃
Thank you for your...   [2] ◂— 612
Hi Brett, Your donation to the San Francisco Good Cause has been...

628 — Show More Results

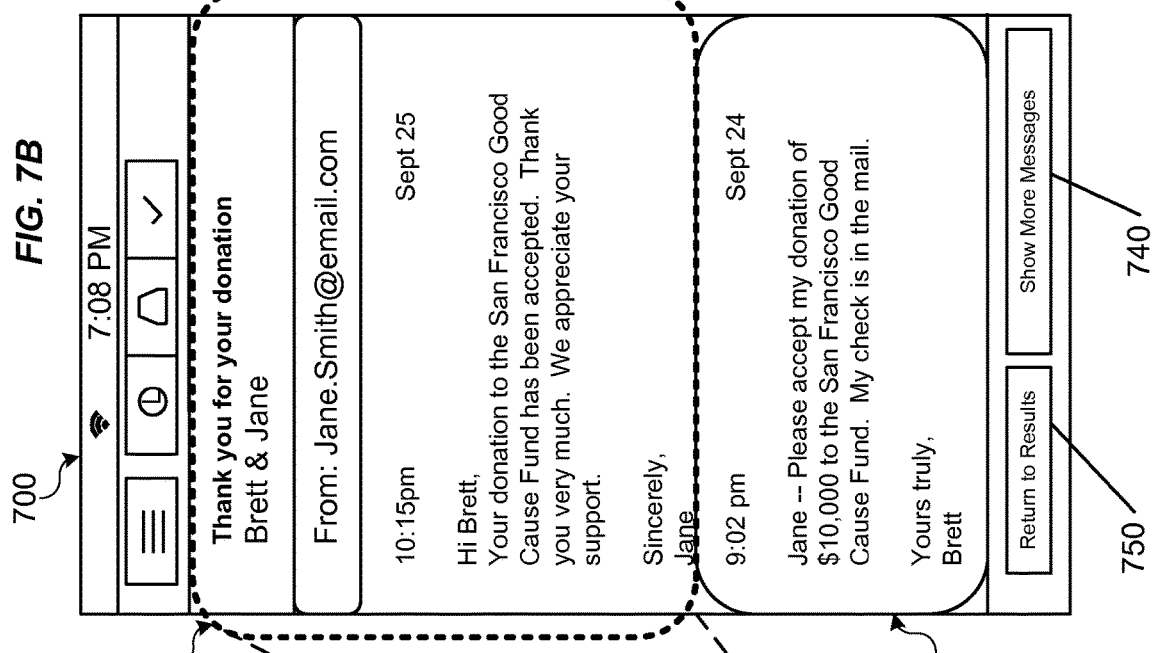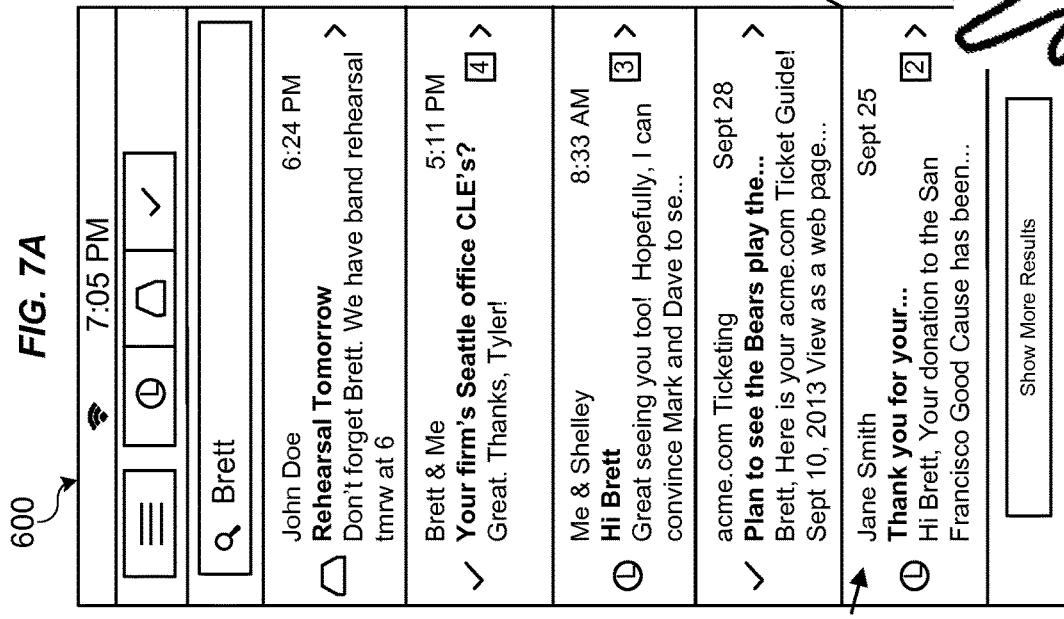
FIG. 7A
FIG. 7B

FIG. 8A

- 620 John Doe — 6:24 PM — Rehearsal Tomorrow — Don't forget Brett. We have band rehearsal tmrw at 6
- 622 Brett & Me — 5:11 PM — Your firm's Seattle office CLE's? — Great. Thanks, Tyler! [4]
- 624 Me & Shelley — 8:33 AM — Hi Brett — Great seeing you too! Hopefully, I can convince Mark and Dave to se.... [3]
- 626 acme.com Ticketing — Sept 28 — Plan to see the Bears play the... — Brett, Here is your acme.com Ticket Guide! Sept 10, 2013 View as a web page....
- 628 Jane Smith — Sept 25 — Thank you for your... — Hi Brett, Your donation to the San Francisco Good Cause has been... [2]

Show More Results

FIG. 8B

- 830 Jane Smith — 9:10 PM — Pleasure to meet you — Hi Brett, It was a pleasure to meet you.
- 620 John Doe — 6:24 PM — Rehearsal Tomorrow — Don't forget Brett. We have band rehearsal tmrw at 6
- 622 Brett & Me — 5:11 PM — Your firm's Seattle office CLE's? — Great. Thanks, Tyler! [5]
- 624 Me & Shelley — 8:33 AM — Hi Brett — Great seeing you too! Hopefully, I can convince Mark and Dave to se....[3]
- 626 acme.com Ticketing — Sept 28 — Plan to see the Bears play the... — Brett, Here is your acme.com Ticket Guide! Sept 10, 2013 View as a web page....

Show More Results

US 11,444,892 B2

ENHANCING PERFORMANCE OF MESSAGE SEARCH AND RETRIEVAL

CROSS-REFERENCE TO RELATED APPLICATIONS

This application claims priority to U.S. application Ser. No. 14/157,439 filed Jan. 16, 2014, which is hereby incorporated by reference in its entirety.

BACKGROUND

The present disclosure relates generally to search and retrieval of content, and more specifically to improving performance of search and retrieval of electronic messages, such as email messages.

Content generally refers to a type of data, such as an electronic message (e.g., an email message), a video, an image, electronic calendar content (e.g., an electronic calendar entry), or audio. A "content item" as used herein broadly refers to a single item or instance of a type of content (e.g., an electronic message, a video, audio, or an image). A client device (e.g., a mobile phone) can store content items in local cache or memory for relatively fast access. However, availability of computing resources (e.g., memory capacity and processor speed) in a client device can affect the number of contents items that the client device can store and the rate at which the content items can be accessed.

A content service provider can provide access to a remote storage repository for storage of content items. Content service providers can include a message service provider, a video service provider, or other type of service provider that provides access to content items. For example, a message service provider can enable a client device to store and access messages (e.g., email messages) on a storage repository accessed by the message service provider. Message service providers can include, for example, Google Mail®, Yahoo Mail®, Hotmail®, or other mail services. A client device can communicate and retrieve electronic messages stored by a content service provider, such as a message service provider, via a communication protocols support by the content service provider. Communication protocols can include a protocol such as a post office protocol (POP) or an Internet message access protocol (IMAP). A remote storage repository accessible via a content service provider can provide a greater capacity for storage of the content items. However, performance for accessing content items (e.g., messages) from a remote storage repository via a content service provider can be affected by a type of communication connection between the client device and/or the repository as well as a bandwidth of the communication connection.

Many people rely on client devices to manage and store content, such as email, for use in everyday life. As the amount of content increases, people may struggle to manage the volume of content (e.g., messages, images, audio, or video) that is generated daily. Client devices may be unable to provide sufficient storage and timely retrieval of information from a large collection of content. People may depend on content service providers for storage and management of content; however, client devices can encounter performance issues with locating information across multiple accounts, which can be managed by different content service providers. Further, bandwidth and/or latency of communication between client devices and content service providers may further affect performance for retrieval of stored content.

SUMMARY

Certain embodiments of the present invention relate to techniques for search and retrieval of messages using a message management service that can act as a proxy or intermediary between a user-operated client and one or more messaging services. When a client sends a query to the message management service the message management service can receive criteria (e.g., a search query) from a client to search for messages of interest to a user of the client. The messages stored locally by the message management service can include a subset of messages stored for a user by one or more messaging services.

Rather than responding to a client with actual messages that are responsive to a query, the message management service can send one or more initial responses with information descriptive of all or some of the messages, if any, that satisfy the search criteria. The information descriptive of the messages can include enough information to enable a user to distinguish messages from each other and less than all of the message content. Because an initial response to a search request can include information descriptive of messages rather than actual messages, the initial responses can be smaller in size and therefore can be communicated to the client faster with little or no delay. After providing one or more initial responses, the message management service can provide supplemental responses that include additional information about messages identified in the initial responses. For example, a supplemental response can include thread information, such as a thread identifier (thread ID), which identifies a message thread that includes one or more other messages related to a message identified in an initial response. The thread ID can enable the message management service to identify other messages that are related to messages identified in an initial response. The message management service can retrieve specific messages in response to a request from the client for particular messages.

In certain embodiments, performance can be further enhanced by the message management service sending the full content of messages responsive to a query (and/or related messages) to a client before receiving specific requests from the client. In this manner, a client can receive messages before or immediately after a user requests a particular message. A user of a client can perceive an improvement in performance because a time to retrieve the messages can be reduced.

In certain embodiments, a message management service can split delivery of responses into multiple separate communications. A determination as to a number of communications can be based on a type and/or status of a communication connection between the message management service and the client.

In certain embodiments, the message management service can search multiple accounts associated with a user to locate messages that satisfy a query received from a client. For example, the message management service can send a request to a messaging service to search for messages in multiple accounts managed for a user that requests a search of the accounts. In another example, the message management service can search multiple accounts, where each account can be managed by a different messaging service. In this example, the message management service can send a request to each messaging service to search for messages in an account managed for a user. An initial response provided to a client can identify the messages located in the different accounts managed by different messaging services. By providing the ability to search multiple accounts that can be managed by different messaging services, the message management service can enable a user to expand a scope of search to across multiple accounts for email messages and/or multiple messaging services that store messages.

Some embodiments can perform one or more techniques for improving search and retrieval of content items. One technique can be a method, which can be performed by a server computer of a message management service. The method can include receiving a search query from a client device requesting a search of a corpus of messages for an account. The corpus of messages can include messages stored for the account at a service provider (e.g., a messaging service) that maintains the account. Then a cache of messages (e.g., local storage of the message management service) for the account can be searched to identify a set of messages that satisfy the search query. The messages in the cache can be previously obtained by the server computer from the service provider. The method can include sending an initial response to the client device. The initial response can include information descriptive of at least a first message in the set of messages. The method can include identifying one or more other messages as being related to the first message. The method can include a supplemental response to the client device. The supplemental response can include information indicating that the one or more other messages are related to the first message. Similar techniques can be applied to other types of messages, not limited to email messages.

The following detailed description together with the accompanying drawings will provide a better understanding of the nature and advantages of the present invention.

BRIEF DESCRIPTION OF THE DRAWINGS

FIGS. 6A and 6B are graphical interfaces of a client for searching and retrieving messages according to some embodiments of the present invention.

FIGS. 7A and 7B are graphical interfaces of a client for displaying and retrieving messages according to some embodiments of the present invention.

FIGS. 8A and 8B are graphical interfaces of a client for displaying messages according to some embodiments of the present invention.

DETAILED DESCRIPTION

Figure 1:
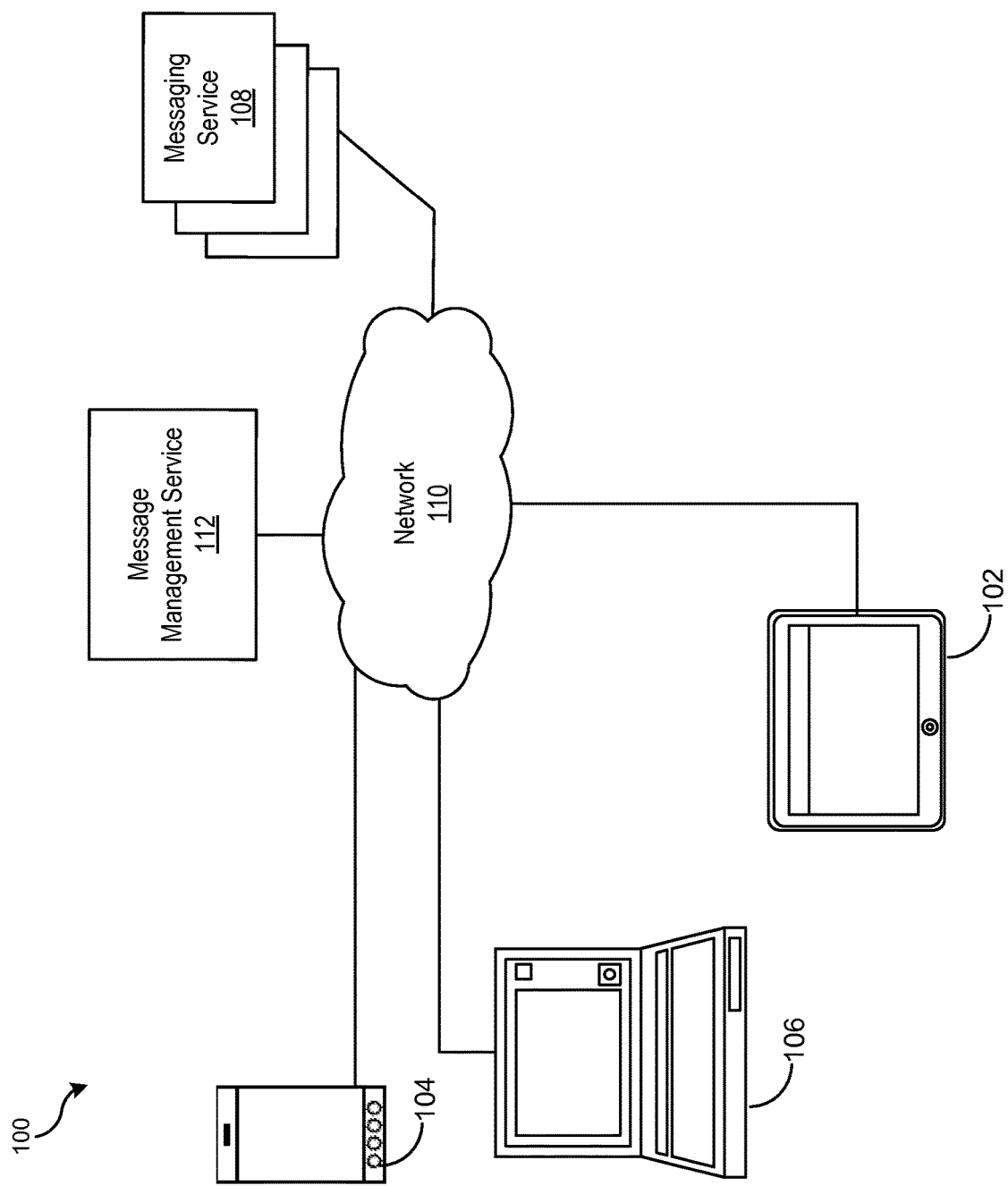
FIG. 1 is a block diagram of a system according to some embodiments of the present invention.

The following description of certain embodiments of the invention is not intended to limit the invention to these embodiments, but rather to enable any person skilled in the art to make and use this invention.

Certain embodiments of the present invention relate to techniques for search and retrieval of messages using a message management service that can act as a proxy or intermediary between a user-operated client and one or more messaging services. As used herein, a message can include any electronic communication generated by a sender and directed to one or more recipients, including an email message, an instant message, a short message service (SMS) message, a multimedia messaging service (MMS) message, a voice message, a photo message, a social network message, etc. A corpus of messages can refer to a collection of messages, such as all the email messages stored for a particular user account by an email service provider. When a client sends a query to the message management service the message management service can receive criteria (e.g., a search query) from a client to search for messages of interest to a user of the client. The messages stored locally by the message management service can include a subset of messages stored for a user by one or more messaging services. It can be desirable for a client device, also referred to herein as a "client", to be able to search and retrieve messages from multiple sources of messages (e.g., multiple accounts) in a message management system.

Rather than responding to a client with actual messages that are responsive to a query, the message management service can send one or more initial responses with information descriptive of all or some of the messages, if any, that satisfy the search criteria. The information descriptive of the messages can include enough information to enable a user to distinguish messages from each other and less than all of the message content. Because an initial response to a search request can include information descriptive of messages rather than actual messages, the initial responses can be smaller in size and therefore can be communicated to the client faster with little or no delay. After providing one or more initial responses, the message management service can provide supplemental responses that include additional information about messages identified in the initial responses. For example, a supplemental response can include thread information, such as a thread identifier (thread ID), which identifies a message thread that includes one or more other messages related to a message identified in an initial response. The thread ID can enable the message management service to identify other messages that are related to messages identified in an initial response. The message management service can retrieve specific messages in response to a request from the client for particular messages.

In certain embodiments, performance can be further enhanced by the message management service sending the full content of messages responsive to a query (and/or related messages) to a client before receiving specific requests from the client. In this manner, a client can receive messages before or immediately after a user requests a particular message. A user of a client can perceive an improvement in performance because a time to retrieve the messages can be reduced.

In certain embodiments, a message management service can split delivery of responses into multiple separate communications. A determination as to a number of communications can be based on a type and/or status of a communication connection between the message management service and the client.

In certain embodiments, the message management service can search multiple accounts associated with a user to locate messages that satisfy a query received from a client. For example, the message management service can send a request to a messaging service to search for messages in multiple accounts managed for a user that requests a search of the accounts. In another example, the message management service can search multiple accounts, where each account can be managed by a different messaging service. In this example, the message management service can send a request to each messaging service to search for messages in an account managed for a user. An initial response provided to a client can identify the messages located in the different accounts managed by different messaging services. By providing the ability to search multiple accounts that can be managed by different messaging services, the message management service can enable a user to expand a scope of search to across multiple accounts for email messages and/or multiple messaging services that store messages.

Prior to discussing the specific embodiments of the invention, a further description of some terms is provided for a better understanding of some embodiments of the present invention.

A "message" can include any electronic communication generated by a sender and directed to one or more recipients, including an email message, an instant message, a SMS message, a MMS message, a voice message, a photo message, a social network message, etc.

"Metadata" can include any data descriptive of a content item (such as a message). Where a content item is a message, e.g., an email message, metadata can indicate information such as a sender of the message, one or more recipients of the message (e.g., a recipient identified in a "to" field, a "cc" field, or a "bcc" field), a subject of the message, date information (e.g., creation date, sent date, receipt date, etc.), time information (e.g., sent time, receipt time, creation time, etc.), preview text, in-reply-to field, references field, format information (e.g., HTML format), message identifier (message ID), thread ID, account information (e.g., login identifier or user identifier), other information identifying the message, or a combination thereof.

A "query" can indicate criteria for searching a corpus of messages. A query can include text that specifies keywords, phrases, and/or terms related to metadata. The text can include numbers, characters, letters, or other type of input that can be parsed.

A "hit" can refer to a message that satisfies a search query.

A "descriptor" can be a structured data record that includes information descriptive of a message. For example, a descriptor can be included in a response to a search query and can provide information descriptive of hits for the query.

FIG. 1 shows message management system 100 according to an embodiment of the present invention. Message management system 100 can include client 102, client 104, client 106, network 110, message management service 112, and messaging service 108. Client 102, client 104, client 106, message management service 112, and messaging service 108 can communicate with each other via network 104. Network 104 can be, for example, the Internet, a mobile network, a wireless network, a cellular network, other communication networks, or a combination thereof.

As used herein a "messaging service" or a "message service provider," such as messaging service 108, refers generally to any service that allows a user to send, receive, store, and/or access messages. A messaging service can be implemented by a computing infrastructure (e.g., one or more computer servers). For example, messaging service 108 can be an email messaging service such as Google Mail®, Yahoo Mail®, or Microsoft Outlook®.

Messaging service 108 can control access to messages based on an account. Each account managed by messaging service 108 can be associated with messages managed for a user (e.g., a user of one or more of clients 102, 104, 106) or a client device, e.g., client device 102, client device 104, or client device 106. Messaging service 108 can provide access to services for messages associated with the account. In some embodiments, messaging service 108 can enable a user to create an account, which can be used by messaging service 108 to manage access to messages stored by messaging service 108, and to perform other operations/services with respect to the messages.

As used herein, a "client" refers generally to a combination of computer hardware and software that can communicate with messaging service 108 and/or message management service 112 to receive or send messages. In the illustrated embodiment in FIG. 1, client 102 can be a mobile computing device, client 104 can be a personal computing device, and client 106 can be a tablet computing device. However, embodiments of the present invention are not limited to this illustrated embodiment as client devices 102, 104, 106 can take any form for use by a user. For example, client device 102 can be a personal digital assistant (PDA), a tablet computer, a laptop computer, a desktop computer, a wearable computer, a pager, etc. Any of the clients described herein can communicate with message management service 112 to access and retrieve messages from messaging service 108. In some embodiments, a user can operate an application (e.g., the Mailbox application provided by Orchestra, Inc.) to access services provided by message management service 112. For example, the application can enable a user to search and retrieve messages accessible for an account managed by messaging service 108. Message management service 112 can communicate with messaging service 108 to access, on behalf of client 102, 104, 104, messaging service 108. For example, client 102 can communicate via message management service 112 to search for messages stored by messaging service 108.

A "message management service," e.g., message management service 112, can refer to a service that acts as a proxy or intermediary between a client and one or more messaging services (e.g., messaging service 108) and that can provide enhanced functionality for organizing, storing, accessing, composing, and/or responding to messages, such as the Mailbox email management service provided by Dropbox, Inc. For example, message management service 112 can enable a user of client 102, 104, 106 to search and retrieve messages associated with one or more accounts, each of which is maintained by a messaging service (e.g., messaging service 108). Message management service 112 can be implemented by a combination of computer hardware and/or software. In some embodiments, message management service 112 can be implemented by a distributed computing infrastructure, such as a collection of servers. As the number of clients and volume of messages in a corpus of messages increases, message management service 112 can be expanded to include additional computing resources to manage information for multiple clients, accounts, and/or messaging services.

At various times, messages in the corpus can be stored by one or more of a client (e.g., client 102), message management service 112, or messaging service 108. Messages can be stored by messaging service 108 in association with one or more accounts, each associated with a user. A subset of the messages for a particular user account can be stored in local cache by message management service 112. For example, message management service 112 can store in local cache messages that have been retrieved from messaging service 108, such as messages recently received by messaging service 108 for an account associated with a user. In another example, messages communicated by a client (e.g., client 102) for an account of a user can be stored locally by message management service 112 and forwarded to messaging service 108 for delivery to a recipient of the messages. A client, such as client 102, can locally store messages received from message management service 112.

In accordance with certain embodiments of the present invention, a user operating a client (e.g., client 102) can use message management service 112 to search for stored messages satisfying particular criteria. The user can enter a query into client 102. In response, client 102 can search any messages it has stored locally and can also send a search query to message management service 112. Message management service 112 can respond to the query by searching its local store of messages and also sending a search query to messaging service 108. Message management service 112 can report search results, including results of its local search and results of the search by messaging service 108, back to client 102. Client 102 can present the results to the user.

Message management service 112 can enhance performance for search and retrieval of messages from messaging service 108 for a client. For example, message management service 112 can reduce a response time for providing a client (e.g., client 102) with results of a search for messages stored by messaging service 108. In some embodiments, message management service 112 can reduce a response time for a search of the corpus of messages by reducing a number of messages included in a single communication to client 102. For example, message management service 112 can send one or more initial responses that include a descriptor for each result of a search, rather than each entire message that is a result. The descriptor can include a minimum amount of information about a hit to enable a user to distinguish the hit from other hits. For example, a descriptor can provide descriptive information about a message, metadata of the message, and/or information identifying other messages that are related. The information in an initial response can be presented by client 102 to enable a user to choose messages of interest. In this manner, bandwidth needed to send a response identifying a message of interest can be reduced, thereby improving a response time for communication of the response.

In some embodiments, message management service 112 can provide supplemental responses to a client (e.g., client 102) concurrently with or immediately after sending one or more initial responses. A supplemental response can provide information identifying a relationship of other messages to a hit identified in an initial response. Message management service 112 can manage and locate thread information identifying one or more message threads, each of which can indicating a relationship between a hit for a search and other messages in a corpus of messages that are related. Relationships between messages can be identified based on content, metadata, or relationship of a topic or subject associated with the messages. The supplemental information can enable a client to identify hits that have a relationship with other messages in a corpus of messages. Message management service 112 can retrieve actual messages and actual related messages upon request for a hit presented based on an initial response.

For purposes of illustration, specific embodiments are described herein for techniques to improve search and retrieval of email messages. In operation, a user of a client (e.g., client 102) can input a search query into client 102 to initiate a search of email messages in a corpus of email messages in message management system 100. In response to receiving a search query, client 102 can search for email messages stored locally on client 102 to identify email messages that satisfy the search query. Email messages may be stored locally by client 102 from a prior retrieval or communication performed via message management service 112. To identify hits for the search, client 102 can search metadata of email messages stored by client 102. Client 102 can identify hits based on information in the metadata that satisfies the search query. Client 102 can also determine whether other email messages are related to the hits (e.g., in a message thread) based on stored information identifying a relationship of other emails to the hits.

In the event that one or more hits are identified for the search, client 102 can display a representation of each hit. The representation can be presented in a display interactive element. The display interactive element can include information in a descriptor of a hit that satisfies the search query, such as a sender of the email message, a recipient of the email message, a portion of the body of the email message, a subject of the email message, and/or a date of the email message. The information in a descriptor or any other descriptive information can enable a user to distinguish between distinct hits of a search. In such embodiments, a display interactive element can enable a user to request additional information about the represented email message (e.g., to view the full message). The additional information about an email message can be presented with one or more related email messages, if any exist.

In response to receiving a search query, client 102 can also request message management service 112 to search for email messages stored locally by message management service 112 and/or locally by messaging service 108. Client 102 can request message management service 112 to search for email messages before, after, or concurrently with client 102 searching in its local storage for email messages. In some embodiments, the request from client 102 to message management service 112 can include account information indicating one or more accounts associated with a distinct portion of email messages in the corpus. The one or more accounts associated with email messages in the corpus can be managed by messaging service 108.

In response to a request to search for email messages, message management service 112 can perform a search of email messages stored locally by message management service 112 and/or can request messaging service 108 to search email messages stored locally by messaging service 108. To reduce search time, message management service 112 can request messaging service 108 to search before, after, or concurrently with message management service 112 searches its own storage to identify hits for a search query.

Message management service 112 can provide one or more responses to client 102 in response to receiving the request to search for email messages. Initially, message management service 112 can provide one or more initial responses to client 102. The initial responses can provide one or more descriptors, each descriptor providing information descriptive of an email message that satisfies the search query specified by input from a user. Each email message identified by the descriptor in an initial response can be locally stored by message management service 112 and/or or stored by messaging service 108. As explained earlier, a descriptor can include information descriptive of an email message to distinguish the email messages for other email messages. A descriptor of an email message in initial response can contain less information than the email message, thereby reducing an amount of data communicated to client 102 in a response to a query. The reduction in data being communicated to client 102 can reduce a response time for present the results of a search to a user of client 102.

Client 102 can display a representation of each hit. Client 102 can combine or merge results from the initial responses received from message management service 112 with results determined from a search of email messages stored locally by client. Client 102 can perform operations such as deduplication to eliminate duplicate results when results are combined from multiple sources. Results can be displayed by client 102 as initial responses are received.

In some embodiments, message management service 112 can provide supplemental information related to a hit identified in an initial response. The supplemental information can include thread information identifying other email messages related to a result (e.g., email messages that are in the same message thread). The supplemental information can be provided to client 102 to be presented with information about the results identified in the initial responses. Message management service 112 can send the supplemental information to client 102 in one or more supplemental responses. A supplemental response can be sent concurrently with or after an initial response so that client 102 can display the supplemental information with an associated result.

In the event that a user selects an email message of interest from results displayed based on an initial response, client 102 can communicate with message management service 112 to retrieve an email message identified as a result. Additionally, message management service 112 can provide other email messages that are related to the selected result (e.g., other email messages in the same thread) and send those other email messages to client 102. Consequently, client 102 can provide a user with related email messages that can enable a user to further identify information of interest to the user.

In some embodiments, client 102 can iteratively initiate new search requests based on additional characters provided to client 102. For example, as a user inputs characters for a query, client 102 can initiate a search based on characters that have been input. In some embodiments, message management service 112 can cancel previous pending search requests received from a client in favor of a new search request to avoid sending results to client 102 for previous search requests. In this manner, message management service 112 can improve performance time for searching and responding to client 112 by processing only the most current search request.

In some embodiments, client 112 can assign a search identifier (search ID) to a search query and send the search ID to message management service 112. Message management service 112 can include the search ID in its responses to the search query associated with the search ID. Based on the search ID, client 102 can identify and display only results corresponding to the current search query. In some embodiments, the search ID can be generated by message management service for each new search query received. Message management service can use the search ID to determine an order of search requests to be able to identify older or previous search requests that can be canceled in favor of a new search request.

By staging delivery of search results into a series of responses, such as one or more initial responses that provide a descriptor of each hit, followed by one or more supplemental responses with supplemental information regarding the hits, a message management service can reduce a response time for providing search results to a client. The information that can be displayed by a client based on an initial response can enable a user to identify specific email messages of interest. By not sending actual email messages to a client until requested by the client, an amount of data communicated between the client and the message management service can be reduced, further improving response time.

Figure 2:
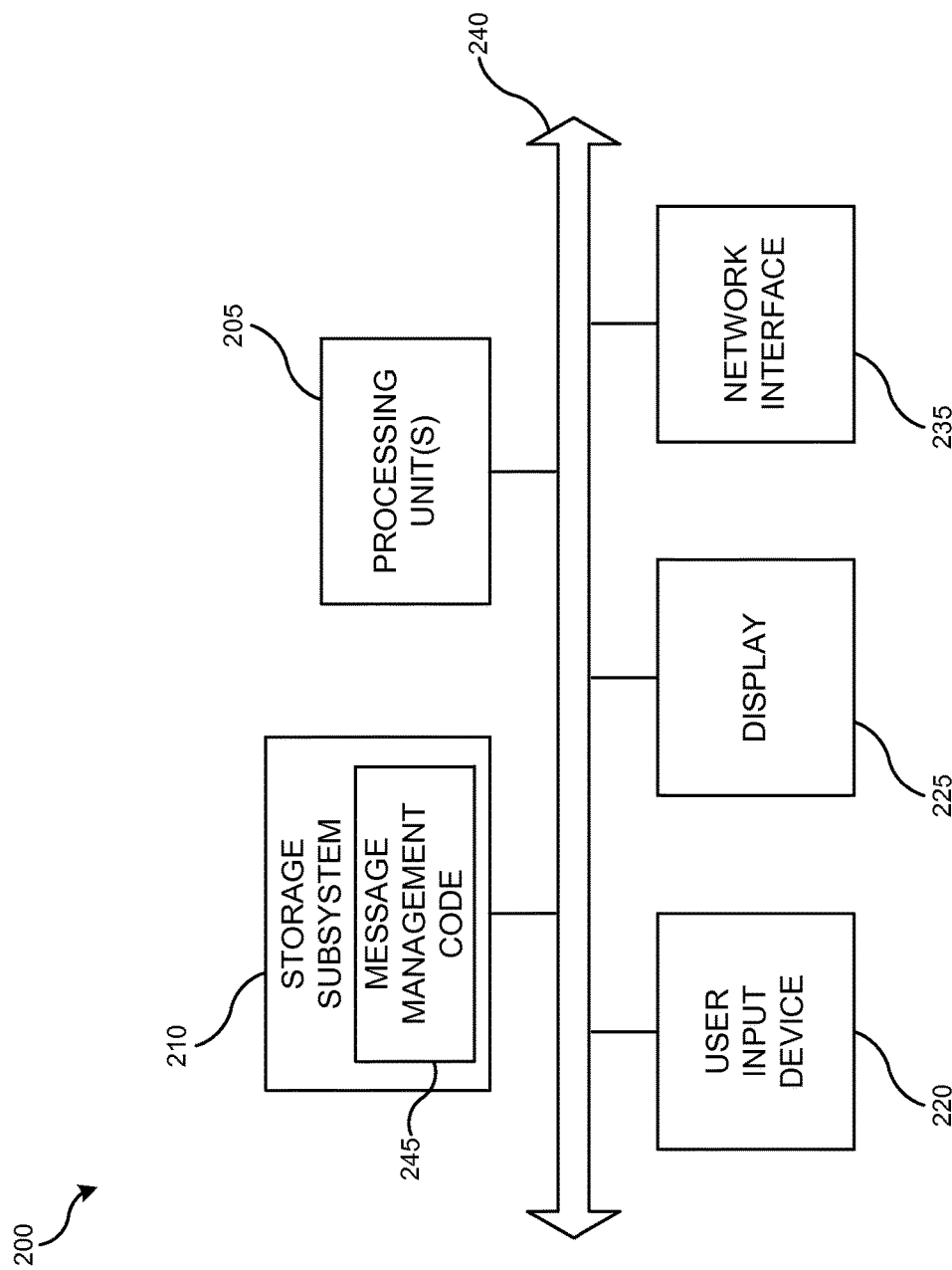
FIG. 2 is a block diagram of a computing system according to some embodiments of the present invention.

FIG. 2 shows a computer system 200 according to an embodiment of the present invention. Computer system 200 can include processing unit(s) 205, storage subsystem 210, input devices 220, display 225, network interfaces implemented in 235, and bus 240. Computer system 200 is a high-level block diagram of a system that can represent a mobile device, a server computer, or any of the computing devices described herein.

Processing unit(s) 205 can include a single processor, which can have one or more cores, or multiple processors. In some embodiments, processing unit(s) 205 can include a general-purpose primary processor as well as one or more special-purpose co-processors such as graphics processors, digital signal processors, or the like.

Storage subsystem 210 can include various memory units such as a system memory, a read-only memory (ROM), and a persistent storage device. A ROM can store static data and instructions that are used by processing unit(s) 205 and other modules of electronic device 200. A persistent storage device can be a non-volatile readable and writable memory unit that stores instructions and data even when computer system 200 is powered down. System memory can be implemented using volatile read-and-write memory, such as dynamic random access memory, or non-volatile memory as desired. The system memory can store some or all of the instructions and data that are currently in use by processing unit(s) 205.

Storage subsystem 210 or units thereof can be implemented using any combination of computer-readable storage media including semiconductor memory chips of various types (DRAM, SRAM, SDRAM, flash memory, programmable ROM) and so on. Magnetic and/or optical disks can also be used. In some embodiments, storage subsystem 210 can include removable storage media that can be readable and/or writeable; examples of such media include compact discs (CD), read-only digital versatile discs (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer-readable storage media do not include carrier waves and transitory electronic signals passing wirelessly or over wired connections.

In some embodiments, storage subsystem 210 can store one or more software programs to be executed by processing unit(s) 205, such as message management code 245. For example, where system 200 implements message management service 112 of FIG. 1, message management code 245 can implement operations or methods described herein as performed by message management service 112 of FIG. 1. Where system 200 implements client 102 (or other clients) of FIG. 1, message management code 245 can implement operations or methods described herein as performed by a client. "Software" refers generally to sequences of instructions that, when executed by processing unit(s) 205, cause computer system 200 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 210, processing unit(s) 205 can retrieve program instructions to execute and data to process in order to execute various operations described herein. Through suitable programming, processing unit(s) 205 can provide various functionality for computer system 200. For example, processing unit(s) 205 can execute message management code 245.

A user interface can be provided by one or more user input devices 220, display device 225, and/or and one or more other user output devices (not shown). Input devices 220 can include any device via which a user can provide signals to computing system 200; computing system 200 can interpret the signals as indicative of particular user requests or information.

Display 225 can display images generated by computer system 200 and can include various image generation technologies. Some embodiments can include a device such as a touchscreen that functions as both touch-sensitive input device and display device. In some embodiments, other user output devices can be provided in addition to or instead of display 225.

In some embodiments, the user interface can provide a graphical user interface, in which visible image elements in certain areas of display 225 are defined as active elements or control elements that the user selects using user input devices 220. For example, the user can manipulate a user input device to position an on-screen cursor or pointer over the control element, then click a button or tap a touch-sensitive surface to indicate the selection. Alternatively, the user can touch the control element (e.g., with a finger or stylus) on a touchscreen device. Other user interfaces can also be implemented.

Network interface 235 can provide voice and/or data communication capability for computer system 200. In some embodiments, network interface 235 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 235 can provide wired network connectivity (e.g., Ethernet) in addition to or instead of a wireless interface. Network interface 235 can be implemented using a combination of hardware (e.g., antennas, modulators/demodulators, encoders/decoders, and other analog and/or digital signal processing circuits) and software components.

Bus 240 can include various system, peripheral, and chipset buses that communicatively connect the numerous internal devices of computer system 200. For example, bus 240 can communicatively couple processing unit(s) 205 with storage subsystem 210. Storage subsystem 210 can include message management code 245 that are configured to cause the processing unit(s) 205 to search and retrieve messages as described herein. Bus 240 also connects to input devices 220 and display 225. Bus 240 also couples computer system 200 to a network through network interface 235. In this manner, computer system 200 can be a part of a network of multiple computer systems (e.g., a local area network (LAN), a wide area network (WAN), an Intranet, or a network of networks, such as the Internet. Any or all components of computer system 200 can be used in some embodiments of the invention.

Some embodiments include electronic components, such as microprocessors, storage and memory that store computer program instructions in a computer-readable storage medium. Many of the features described in this specification can be implemented as processes that are specified as a set of program instructions encoded on a computer-readable storage medium. When these program instructions are executed by one or more processing units, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter.

It will be appreciated that computer system 200 is illustrative and that variations and modifications are possible. Computer system 200 can have other capabilities not specifically described here. Further, while computer system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 3:
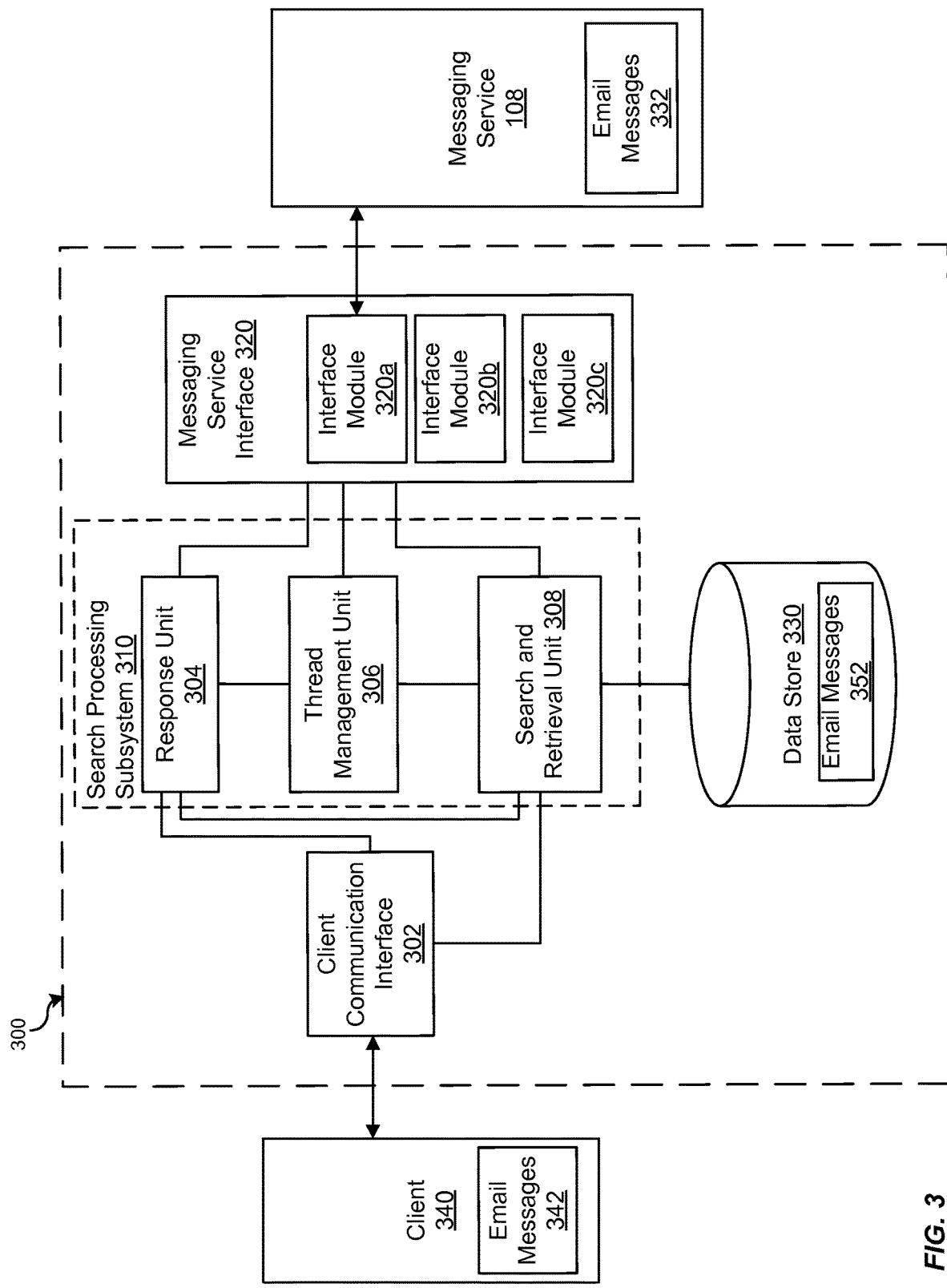
FIG. 3 is a simplified block diagram of components of a message management service according to some embodiments of the present invention.

FIG. 3 shows a simplified block diagram of components of message management service 300 according to some embodiments of the present invention. Message management service 300 can include or implement message management service 112 of FIG. 1.

Message management service 300, according to some embodiments, can act as a proxy or an intermediary between messaging service 108 and client 340. Client 340 can be, for example, any one of client 102, client 104, or client 106. Message management service 300 can be communicatively coupled (e.g., via the Internet) to client 340 and communicatively coupled (e.g., via the Internet) to messaging service 108. Message management service 300 can leverage a network protocol, such as Hypertext Transfer Protocol (HTTP), optimized for communication with client 340 and messaging service 108.

Message management service 300 can function as a proxy for client 340 in interacting with messaging service 108. In certain embodiments, message management service 300 can obtain email messages (e.g., email messages 332) from a corpus of email messages stored by one or more messaging services (e.g., messaging service 108) and can route the email messages to one or more clients (e.g., client 340). Similarly, message management service 300 can receive email messages (e.g., email messages 342) from client 340 for communication to a messaging service, e.g., messaging service 108. Message management service 300 can also store email messages, such as email messages 352, in data store 330. In some embodiments, email messages 352 can include a subset of email messages 332 stored by messaging service 108.

Message management service 300 can include various functional blocks, referred to variously as modules, units, interfaces, and so on, each of which can be implemented using computer hardware and/or software. Each of the functional blocks can be communicatively coupled to one or more other functional blocks included in message management service 300.

Message management service 300 can include client communication interface 302 to enable communication with one or more clients, e.g., client 340. For example, client communication interface 302 can receive requests from client 340, including search requests and requests to retrieve particular email messages. Client communication interface 302 can also communicate information, including responses to search requests, to client 340 on behalf of message management service 300.

In some embodiments, client communication interface 302 can establish a communication connection to client 340. In some embodiments, client communication unit 302 can determine a state of the communication connection to client 340. Client communication unit 302 can maintain connection state information regarding the current connection to a given client. Connection state information can include a status (e.g., connected or disconnected) of a communication connection between client 340 and message management service 300. Connection state information can also include a type of communication connection (e.g., wired or wireless connection, Wi-Fi or cellular data network connection, etc.), a bandwidth, or other measures of connectivity.

Messaging service interface 320 can enable message management service 300 to communicate with one or more messaging services, e.g., messaging service 108. Message management service 300 can include messaging service interface 320. Messaging service interface 320 can include interface modules or components 320a-320c, each specifically configured to communicate with an interface of a different messaging service 108. For example, interface module 320a can be configured specifically for a particular messaging service 108 and can include rules and processing instructions to account for message format issues, interpretation of message updates, specialized features or capabilities, and/or any processing specific to an intended message provider 108. In some embodiments, message management service 300 can use messaging service interface 320 to communicate a request to messaging service 108 to search for email messages, to cancel previous requests to messaging service 108, and to receive search results from messaging service 108.

In some embodiments, messaging service interface 320 can establish a persistent IMAP connection for accessing services provided by messaging service 108. Additionally or alternatively, messaging service interface 320 can use communication protocols such as POP messaging application programming interface (MAPI)/exchange, service application programming interfaces (service APIs) and/or any type of connection for interaction with messaging service 108. Outgoing email messages can be delivered from message management service 300 to messaging service 108 using a communication protocol such as a Simple Mail Transfer Protocol (SMTP) or any other message communication protocol. Message management service 300 can translate account or email message updates delivered from a client (e.g., client 340) into appropriate actions to execute on messaging service 108.

Data store 330 can be implemented using any type of persistent storage device, such as a memory storage device. Email messages 352 and associated metadata can be stored in data store 330 using any type of data structure that enables access to contents and/or metadata of an email message. Data store 330 can be implemented using a document database, a relational database, other type of database, or other storage structures.

Message management service 300 can include search processing subsystem 310 to perform search processing for search requests received from client 340. In some embodiments, search processing subsystem 310 can include response unit 304, thread management unit 306, and search and retrieval unit 308.

Search and retrieval unit 308 can receive search requests from client 340 via client communication interface 302. For example, search and retrieval unit 308 can receive a search request from client 340. The search request can include a search query indicating criteria for searching a corpus of email messages. Search and retrieval unit 308 can search email messages 352 stored locally in data store 330 to identify email messages that satisfy the query. Alternatively or additionally, search and retrieval unit 308 can communicate with messaging service 108 via messaging service interface 320 to request a search of email messages 332 accessible to messaging service 108. Search and retrieval unit 308 can receive responses communicated from messaging service 108. The responses can include information (e.g., email messages or metadata) requested by search and retrieval unit 308. In some embodiments, search and retrieval unit 308 can also receive requests from client 340 via client interface 302 to retrieve email messages based on an identifier, such as a thread ID, message ID, or other information that can be used to identify a specific email message or group of messages. Such requests can be based on results of a search request previously provided to client 340.

In some embodiments, search and retrieval unit 308 can store the results of a search request in association with a search ID for easy identification of the results for the search request. Search and retrieval unit 308 can also store information identifying a relationship of email messages. The information identifying a relationship of email messages can include thread information, such as a thread ID, which identifies a message thread associated with one or more related email messages. Thread information can be obtained from thread management unit 306, which is described in further detail below.

Response unit 304 can generate responses described herein as being generated by message management service 300. A response generated by response unit 304 can be communicated to client 340 via client communication interface 302. In some embodiments, response unit 304 can generate one or more responses to a search request, such as a search request received by search and retrieval unit 308. For example, response unit 304 can generate one or more initial responses, one or more supplemental responses, one or more responses providing new or additional email messages that have been received, or a combination thereof. Response unit 304 can also generate a descriptor for an email message to be included in an initial response.

Thread management unit 306 can determine information identifying relationships between email messages. Thread management unit 306 can store thread information in data store 330, e.g., as a list of message IDs of messages that belong to a particular thread. In some embodiments, information determined by thread management unit 306 can be communicated to any of the other components in message management service 300 that request such information, for instance, by allowing such components to retrieve thread information from data store 330. In some embodiments, thread management unit 306 can communicate with message service 108 to obtain thread information about one or more email messages. The thread information can be obtained from messages received from messaging service 108.

Message management service 300 can provide any number of services in addition to functions or services described above. Message management service 300 can provide services for windowing delivery of email messages. Windowing can involve a transfer of immediately relevant (e.g., recent) email messages to an application of client 340. For example, message management service 300 may transfer information for a particular number (e.g., 100) of recent email messages associated with an account even if more than the number of recent email messages exist which a user of client 340 has not seen. Message management service 300 can provide other services for accessing or managing email messages for storage, such as archiving or saving. Message management service 300 can manage state and delivery of multiple message streams, such as a message stream for receiving email messages from messaging service 108. A message stream can refer to a collection of messages. For example, a message stream can correspond to a folder in an email message account. Other content streams can correspond to archived messages, message folders, labels for messages, special folders (e.g., starred messages or deferred messages), and/or any collection of messages.

Figure 4:
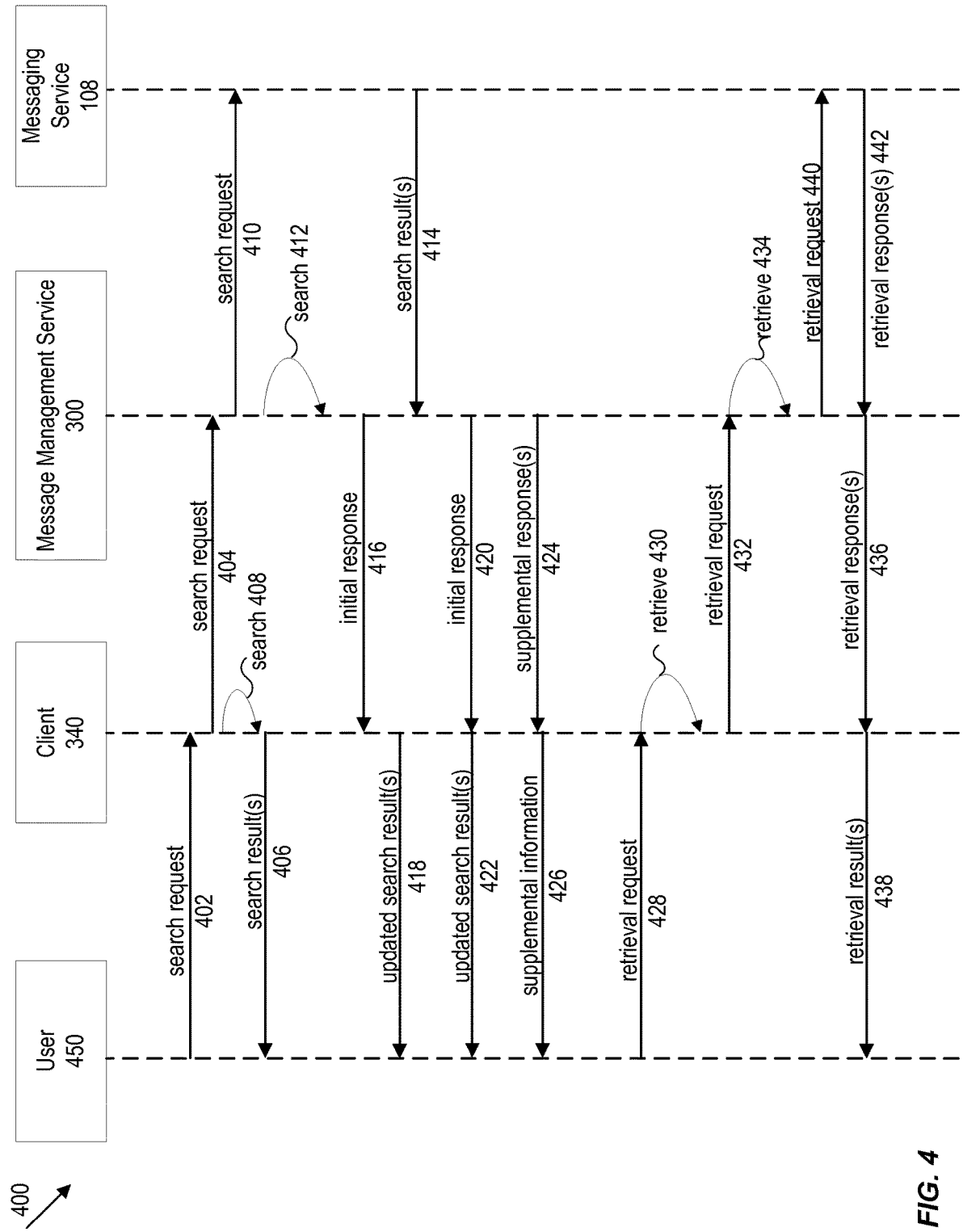
FIG. 4 is a sequence diagram of a process for search and retrieval of messages according to some embodiments of the present invention.

FIG. 4 shows a sequence diagram of a process 400 for search and retrieval of email messages using message management service 300 according to some embodiments of the present invention.

Through a client, e.g., client 340, a user 450 can instruct message management service 300 to retrieve email messages based on a search query input to client 340 by user 450. Message management service 300 can search for email messages that are stored in multiple locations, such as locally by message management service 300 and at messaging service 108. Message management service 300 can send multiple responses to client 340 to provide results for a search query specified by user 450. Sending multiple responses to a search request can enable client 340 to reduce an amount of time needed to present search results to a user. The reduced response time can enable the user to more quickly identify and access email messages of interest.

Process 400 can begin with client 340 receiving user input (search request 402) indicating criteria (a search query) for searching email messages. Search request 402 can indicate one or more accounts (e.g., a user name and/or service provider identifier) for which email messages are to be searched.

In response to search request 402, client 340 can send a search request (search request 404) to search processing subsystem 310 of message management service 300. Search request 408 sent from client 340 can include the information identifying one or more accounts to be searched. Client 340 can also determine results for search request 402 by conducting a search 408 of local storage on client 340 to identify email messages that satisfy the search query for search request 402. In some embodiments, search request 404 can be sent to message management service 300 before, after, or concurrently with client 340 conducting a search 408 of its storage for email messages. By sending search request 404 concurrently with conducting a search 408 of local storage on client 340, response time for presenting results responsive to search request 402 can improved.

If any hits are found in local search 408, client 340 can display to user 450 search result(s) 406 identifying email messages that satisfy the search query for search request 402. In some embodiments, the display of search result(s) can include a representation of the descriptor of each hit, which can include information such as subject, sender, date, preview portion of the message body, etc. The number of hits displayed at once can be based on a size of display of client 340, and in some embodiments, hits can be displayed in a scrollable list. In some embodiments, a representation of a hit can be presented in association with one or more interactive elements that can allow user 450 to request the full email message.

In response to receiving search request 404 at message management service 300, search processing subsystem 310 can conduct a search for email messages that satisfy the query. To conduct the search, search processing subsystem 310 can send search request 410 to one or more messaging services, e.g., messaging service 108, to search email messages 332 for hits responsive to search request 404. Search request 410 can include the search query identified in search request 404 and can be reformatted to be compatible with communication protocols recognized by messaging service 108. In some embodiments, search request 410 can include information identifying one or more accounts to be searched, and messaging service 108 can search for email messages in the specified account(s).

Search processing subsystem 310 can also perform a search 412 of email messages stored locally by message management service 300 to identify hits for search request 404. In some embodiments, search processing subsystem 310 can perform a search of email messages 352 in data store 330 for hits that satisfy search request 404. Search processing subsystem 310 can generate a descriptor for each hit for search request 404. The descriptor can include metadata about the hits, such as a descriptor of the hits. In some embodiments, the information identifying the hits (e.g., a message ID) can be used at a later time to retrieve actual email messages that represent the hits. In some embodiments, search processing subsystem 310 can store the descriptor.

In some embodiments, search request 410 can be sent to messaging service 108 before, after, or concurrently with message management service 300 conducting a search 412 of its local storage for email messages. By sending search request 410 concurrently with conducting a search 412 of local storage of message management service 300, response time to client 340 for presenting results responsive to search request 404 can be improved because message management service 300 can search its local cache of email messages (e.g., email messages 352) and report the results to client 340 while messaging service 108 conducts a search of its locally stored email messages (e.g., email messages 332). In some embodiments, where messaging service 108 can take more time to search for email messages than message management service 300 takes to search local storage, or vice versa, results can be returned to client 340 as hits are identified. As a result, an overall response time for presenting results to user 450 can be improved.

Messaging service 108 can send search results 414 to message management service 300. Search results 414 can include information identifying hits found by messaging service 108. In some embodiments, search results 414 can include actual email messages. In some embodiments, search results 414 can include metadata of each hit. The metadata can be used to retrieve an email message corresponding to a hit. The metadata can contain sufficient information that enables search processing subsystem 310 to generate a descriptor about each email message that satisfies the query. By receiving metadata about hits first, rather than complete email messages, message management service 300 can reduce time needed to communicate results from messaging service 108 to client 340, thereby improving a response time for providing search results to client 340. Search processing subsystem 310 can store metadata about the search results, such as a descriptor of the search results.

Search processing subsystem 310 can generate one or more initial responses (e.g., initial response 416 and initial response 420) to be sent to client 340 to identify hits responsive to search request 402. An initial response 416, 420 can include descriptors of some or all of the hits identified by local search 412 conducted by search processing subsystem 310 and/or the hits identified in search result(s) 414. In some embodiments, results for local search 412 and search results 414 can be can be determined at different times. For example, message management service 300 can determine results for local search 412 before search results 414 have been received. Search processing subsystem 310 can generate and send one or more initial responses (e.g., initial response 416 or initial response 420) based on results that have been determined for search request 404. For example, search processing subsystem 310 can generate one or more initial responses, such as initial response 416, based on local search 412 before message management service 300 receives search results 414 from messaging service 108 for search request 410. In this manner, a response time for search request 404 can be reduced because client 340 can receive an initial response 416, which client 340 can use to present information descriptive of results for search request 402 to user 450, before the search by message service 108 is complete. Once messaging service 108 responds with search results 414, search processing subsystem 310 can generate and send one or more initial responses, such as initial response 420, based on search results 414. In another example, if search results 414 are received before results are determined for local search 412, search processing subsystem 310 can generate and send initial response 416 based on search results 414 when search results 414 are received, and another initial response 420 can be sent when results are eventually determined for search 412.

In some embodiments, an initial response 416 can include a descriptor for each hit identified by message management service 300 and/or identified in search result(s) 414. A descriptor can include metadata about a hit, such as a message ID of the hit and other information that enables user 450 to distinguish the hit from other hits. For example, the descriptor of an email message can include a subject, a sender, a date, and a short extract from the body of the email message (also referred to as a preview portion).

In some embodiments, search processing subsystem 310 can generate multiple initial responses 416, 420, each including descriptors for a different subset of the hits for search request 402. For instance, search processing subsystem 310 can generate multiple initial responses 416, 420 based on determining that due to size constraints, a single initial response 416 cannot include descriptors of all currently known hits for search request 402. The number of descriptors sent in a single initial response (e.g., initial response 416 or initial response 420) can be based in part on bandwidth capacity of a communication connection between message management service 300 and client 340. For example, message management service 300 can send multiple initial responses if client 340 is connected to message management service 300 on a slow communication connection. Bandwidth capacity can be determined based on connection state information described above.

In some embodiments, search processing subsystem 310 can send an initial response (e.g., initial response 416 or initial response 420) as soon as search processing subsystem 310 has determined some hits for search request 404. In this manner, message management system 300 can provide client 340 with results as soon as results are available, thereby improving a response time for delivery of results for a search request (e.g., search request 402).

In some instances, hits identified in local storage of message management service 300 and hits identified by messaging service 108 can overlap, such that some hits are identical. In such embodiments, search management subsystem 300 can perform deduplication of hits to remove duplicated hits for search request 404. Search processing subsystem 310 can perform deduplication based on an identifier (e.g., a message ID) of each hit. In some embodiments where initial response 416, 420 is sent for results that can be determined before results are determined for search request 410 or search 412, search processing subsystem 310 can store information about each message (e.g., a message ID) that has been sent in an initial response. Message processing subsystem 310 can perform deduplication using the stored information about messages that have been identified in previous initial responses (e.g., initial response 416 or initial response 420). Deduplication can prevent message management service 300 from sending a descriptor of the same hit twice, thus further conserving bandwidth.

As each initial response (e.g., initial response 416 or initial response 420) is received, client 340 can modify or update a display of client 340 to display information (e.g., updated search results 418, 422) identifying each email message identified in an initial response that has been received. For example, client 340 can update a display of search results 406 to include updated search results 418 when initial response 416 is received. Client 340 can update a display of results to include updated search results 422 when initial response 420 is received. In some embodiments, client 340 can perform deduplication to prevent display of the same result twice.

Updated search result(s) 418, 422 can be received before, after, or concurrently with receipt of search results 406. Client 340 can update a display of search results for search request 402 to include updated search results 418, 422. When displayed together, search result(s) 406 and updated search result(s) 418, 422 can be displayed in any order, such as based on date and time.

In some embodiments, search processing subsystem 310 can generate one or more supplemental responses 424 to be sent to client 340. A supplemental response 424 can include supplemental information about the email messages identified in an initial response 416. In some embodiments, supplemental response 424 can be sent immediately after one or more initial responses 416, 420 have been sent to enable client 340 can display the supplemental information with results displayed based on information in the initial response(s) 416, 420 before the results based on the initial response(s) 416, 420 are displayed. In other embodiments, supplemental response 424 can be sent after client 340 has displayed information based on initial response(s) 416, 420, and client 340 can update its display based on supplemental response 424. Examples are described below.

The supplemental information included in supplemental response(s) 424 can identify a relationship of one or more other email messages to hits for search request 402, e.g., by providing a thread ID corresponding to one of the message IDs included in initial response 416, 420. Thread information (e.g., a thread ID) identifying other email messages related to a hit can be determined by search processing subsystem 310 as described above. In some embodiments, the thread information can be obtained by message management service 300 from messaging service 108. The supplemental information can also indicate a count of email messages related to a message thread identified by a thread ID, other statistics associated with the message thread, identifiers of one or more folders that contain email messages associated with the message thread, a number of attachments or files associated with the message thread, and so on. In some embodiments, a supplemental response 424 can include other information about the hit (e.g., a preview portion or sender name) that was not available to message management service 300 when initial response 416 or initial response 420 that included a descriptor of that hit was generated.

Client 340 can present supplemental information 426 obtained in supplemental response(s) 424. Client 340 can update a display of one or more search results 406, 418, 422 to incorporate supplemental information 426 to provide user 450 with additional details about a hit, such as a number of messages that are related to the hit. In some embodiments, client 340 can display supplemental information 426 with updated search result(s) 418, 422 in the event that supplemental response(s) 426 is received before client 340 displays search result(s) 418. In the event that all or a portion of search result(s) 406, 418, 422 have been displayed, client 340 can update a display of search result(s) 406, 418, 422 to include supplemental information 426. Examples of displaying and updating search results are described below.

User 450 can interact with the displayed search results 406, 418, 422 in order to obtain one or more email messages associated with a result. User interaction with a displayed search result can cause client 340 to receive input, which can indicate a retrieval request 428 for one or more email messages related to a displayed result. In some embodiments, a user 340 can initiate retrieval request 428 before supplemental information 426 and/or all results (e.g., updated search results 418, 422) have been received. So long as at least one hit is presented by the client 340, user 450 can request retrieval of the email message.

In response to a retrieval request 428, client 340 can determine the message ID of the requested email message. In some embodiments, the retrieval request can include a request for all messages in a thread that includes one of the hits, and client 340 can determine a thread ID in addition to or instead of a message ID.

Using the message ID (or other identifying information), client 340 can attempt to retrieve 430 the requested email from local storage. If the email message is stored locally on client 340, client 340 can present retrieval result(s) 438 including the content of the email message. If the email message is not stored locally on client 340, client 340 can send a retrieval request 432 to message management service 300. Retrieval request 432 can include the message ID (or other identifying information) of the requested message. If a thread ID is provided, client 340 can attempt to retrieve multiple email messages belonging to the identified thread.

In response to retrieval request 432, search processing subsystem 310 can attempt to retrieve 434 the requested message using information in retrieval request 432. For example, search processing subsystem 310 can retrieve 434 email messages, if available, from local storage (e.g., data store 330) using a message ID of each email message identified in retrieval request 430. If retrieval request 432 includes a thread ID, search processing subsystem 310 can also retrieve 434 related messages based on the thread ID in addition to or instead of a message ID. In some embodiments where retrieval request 432 includes just a message ID, search processing subsystem 310 can determine a thread ID of a message thread associated with the requested email message. Based on the thread ID, message management service 300 can determine message ID's of related email messages and can retrieve 434 the related email messages from data store 330.

If a requested message, or a related message, is not found in data store 330, message management service 300 can send retrieval request 440 to messaging service 108 to retrieve the missing email message(s). Retrieval request 440 can include a message ID of each email message that search processing subsystem 310 has identified as responsive to retrieval request 432 (e.g., other messages in the same message thread) and that is not in data store 330. Messaging service 108 can send one or more retrieval responses 442 to message management service 300. Each retrieval response 434 can include one or more email messages requested for retrieval by message management service 300.

Message management service 300 can send one or more retrieval responses 436 to client 340. Message management service can generate each retrieval response 436 to include one or more email messages requested in retrieval request 432. Additionally, retrieval response 436 can include email messages that are related to the one or more requested email messages.

Client 340 can present retrieval results 438 to user 450 in response to receiving retrieval response 436. Client 340 can present email messages identified in retrieval response 436 as retrieval response 436 is received. Retrieval results 438 can be presented before updated search results 418, 422 and/or supplemental information 426 is received.

Although appearing in a particular order in FIG. 4, the operations of process 400 can occur in a different order than shown. In some embodiments in which information (e.g., search results 406, updated search results 418, 422 and/or supplemental information 426) is received after a user has requested (e.g., retrieval request 428) to retrieve an email message, client 340 can store the information for display at a later time (e.g., when user 450 changes a display at client 340 to view results for search request 402).

In some embodiments, message management service 300 can enable a client to retrieve email messages from multiple locations and/or multiple accounts. By staging delivery of information about email messages that satisfy a query, a client can receive a response with at least some results in a reduced amount of time, thereby enabling a user to locate email messages of interest faster. Further, the example shown in FIG. 4 illustrates how a message management service can process a search request in parallel such that it can search its own storage for local copies of an email message while requesting a messaging service to search for email messages. In this manner, a message management service can identify and thus deliver results faster to a client. In addition, by staging delivery of supplemental information after an initial response has been sent, the client can receive supplemental information without delaying presentation of some initial information about email messages that satisfy a request. Supplemental information can be added to the display as it is received by the client.

Figure 5:
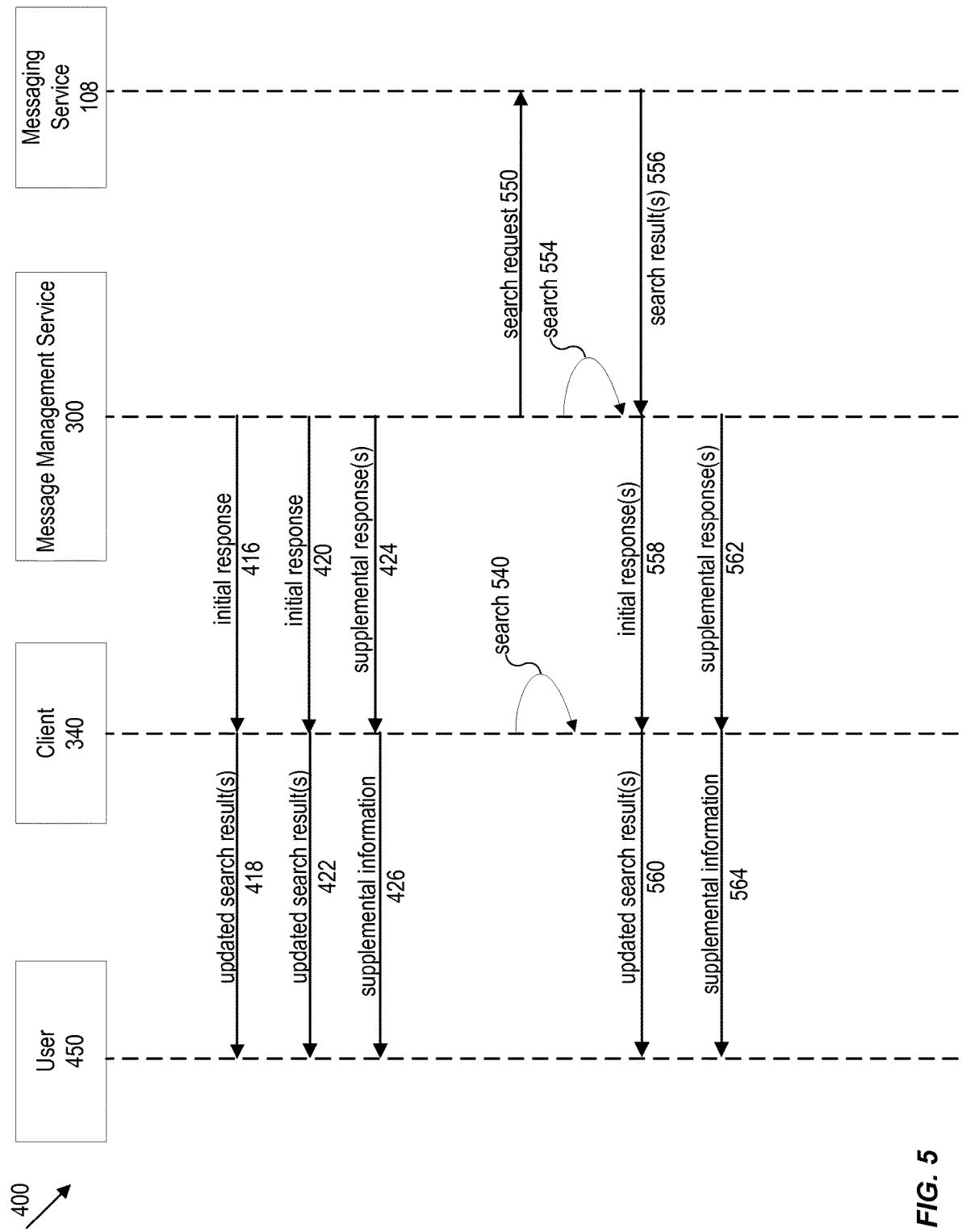
FIG. 5 is a sequence diagram of a process for search and retrieval of messages according to some embodiments of the present invention.

FIG. 5 shows a sequence diagram of a process 500 for search and retrieval of email messages according to some embodiments of the present invention. Like reference numbers and designations in FIG. 5 indicate like elements described herein. Specifically, FIG. 5 shows techniques to update search results when new email messages relevant to the search query are received after search results have been determined using process 400 of FIG. 4. For example, process 500 enables client 340 or message management service 300 to identify new email messages that are received after responses (e.g., initial responses 416, 420 and/or supplemental responses 424) have been communicated to client for an existing search request (e.g., search request 404). In some embodiments, the process 500 can occur at any time before, after, or concurrently with a retrieval request for messages (e.g., retrieval request 428).

In some embodiments, a user's account might receive new email messages (e.g., at message service 108) after a search has been performed and while the client is displaying results of the search. Such new messages can be searched as they are received and, if they are hits, added to the search results presented to the user.

In the example shown in FIG. 5, client 340 can receive and present initial responses 416, 420 and supplemental responses 424. Thereafter, client 340 and/or message management service 300 can initiate a search for new email messages. Client 340 can search its local storage for new email messages that are received after it has searched its local storage (operation 408 of process 400) and/or after it has received initial responses 416, 420 from message management service 300. Client 340 can periodically search for new email messages or search each new email message upon receipt. Upon identification of new email messages that satisfy the query, client 340 can present updated search results 560 to user 450 identifying the new email messages that satisfy the search query for search request 402. For example, client 340 can add the new email message to the list of displayed messages. The new message can be displayed in a format indicating that it is new (e.g., a distinctive font, color, or visual element). Updating a display with new email messages is described below with reference to FIGS. 8A and 8B.

Independently or based on a request from client 340, message management service 300 can send a search request 550 to messaging service 108 to search for new email messages for an email account identified by search request 402. Upon identification of new email messages satisfying the search query identified by search request 402, messaging service 108 can send to client 340 one or more search results 556 identifying new email messages. Message management service 300 can generate one or more initial responses 558 in response to receiving a search result 556, in a manner similar to that described above with reference to FIG. 4. An initial response 558 can be generated as a search result 556 is received.

Message management service 300 can also initiate a search 554 for new email messages that are received in its local storage after message management service 300 has communicated initial responses 416, 420 to client 340. Message management service 300 can periodically or intermittently search for new email messages. Upon identification of new local email messages, message management service 300 can send one or more initial responses 558 to client 340.

In some embodiments, message management service 300 can automatically receive all new email messages for an account of user of client 340 from messaging service 108. For example, message management service 300 can periodically poll messaging service 108 to obtain new email messages, or messaging service 108 can act on a standing request to push new email messages to message management service 300 upon receipt. Where message management service 300 automatically receives all new email messages and a search is active when a new message is received, message management service 300 can apply the search query to the new email message and send an initial response 558 (and supplemental response 562 if appropriate) in the event that the new email message satisfies the query.

Upon receiving of the one or more initial responses 558, client 340 can update search results 560 with the new email messages identified by descriptors in the one or more initial responses 558. In some embodiments, message management service 300 can send search request 550 concurrently with searching 554 its local storage.

Message management service 300 can generate one or more supplemental responses 562 that include supplemental information about the new email messages identified in an initial response 558. Generation of supplemental responses 562 can be similar to generation of supplemental responses 424 described above.

Client 340 can present supplemental information 564 obtained in supplemental response(s) 562, e.g., by updating a display of updated search results 560 to present supplemental information 564 corresponding to a new hit.

As described above, client 340 can present search results to user 450 in an interactive format. FIGS. 6A and 6B each show a graphical user interface (GUI) 600 of a client for searching and retrieving messages according to some embodiments of the present invention. GUI 600 can be generated and presented by a client (e.g., client 340) according to some embodiments of the present invention. GUI 600 can enable a user to search and retrieve messages in message management system (e.g., message management system 100). GUI 600 can display results of a search of email messages and can enable a user to retrieve additional information about the results, including related email messages.

GUI 600 can enable user 450 to provide input 610 including a search query (e.g., "Brett") for searching email messages in a message management system, e.g., message management system 100. Although not shown in FIG. 6, client 340 can receive input that identifies one or more email accounts to be searched. For instance, client 340 may be linked to a single account or to multiple accounts, and the user can specify whether to search all linked accounts or select a specific account (or accounts) to be searched.

GUI 600 can display search results (e.g., search result(s) 406 and/or updated search result(s) 418, 422 of FIG. 4) identifying email messages that satisfy the search query specified by input 610. GUI 600 can present search results based on one or more initial responses (e.g., initial response 416, 420). GUI 600 can present a display interactive element for each hit identified in an initial response. For example, in FIG. 6A, GUI can present display interactive elements 620, 622, 624, 626, and 628. Each display interactive element 620, 622, 624, 626, 628 can present information from a descriptor for a different email message identified in an initial response.

In certain embodiments, GUI 600 can include other interactive elements, such as additional results control 630 that enables a user to display additional hits that are not presented in GUI 600. Alternatively or additionally, the display area in GUI 600 (or a portion thereof) can be scrollable to allow the user to see additional hits that are not currently visible. Although not shown, client 340 can enable a user to specify information indicating display preferences for results of a search. In certain embodiments, client 340 can dynamically determine a number of hits to display in GUI 600, e.g., based on a display size of client 340. GUI 600 can present more or fewer hits based on an amount of information to be represented for each hit.

In certain embodiments, client 340 can determine a number of hits to display based on a number of accounts searched. In some embodiments, GUI 600 can present an equal number of hits from each account searched without exceeding a maximum number of hits that can be displayed at one time in GUI 600. For example, if client 340 can display five results and client 340 has received at least one result from each of five accounts that have been searched, GUI 600 can display a result for each account. However, client 340 can display any number of results from each account. In some embodiments, results can be displayed in GUI 600 according to an order based on time, date, a sender, a recipient, other information in descriptive information, or a combination thereof.

GUI 600 in FIG. 6A shows a display based on initial responses received from message management service 300. In some embodiments, GUI 600 can be updated with supplemental information 426 as a supplemental response 424 is received from message management service 300. FIG. 6B shows GUI 600 after GUI 600 in FIG. 6A is modified with supplemental information (e.g., supplemental information 426).

As shown in FIG. 6B, GUI 600 can be modified to present supplemental information (e.g., supplemental information 426) with one or more hits displayed by each display interactive element 620, 622, 624, 626, 628. For example, GUI 600 can be updated to display an indication of a number of related email messages 612 in association with display interactive element 628 for an email message. The number of related email messages can be determined based on supplemental information 426. GUI 600 can be updated to include a representation (e.g., an icon, name, or graphical symbol) identifying a message thread or group (e.g., a folder) associated with a result. For example, in FIG. 6B, GUI 600 can display icon 630 (e.g., indicating an inbox folder), icon 632 (e.g., indicating an archive folder), icon 634 (e.g., indicating a save folder), icon 636 (e.g., indicating a save folder), and icon folder 638 (e.g., indicating an archive folder), each associated one of the hits. In some embodiments, a folder can be presented as an image or an interactive element that identifies how a message has been classified or stored using message management service 300 or messaging service 108.

FIG. 7A shows GUI 600 from FIG. 6B. FIG. 7B shows GUI 700 of a client to display and retrieve messages according to some embodiments of the present invention. In particular, FIG. 7B shows email messages that can be displayed in GUI 700 by client 340 as a result of user interaction with GUI 600.

In this example, a user (e.g., user 450) interacting with GUI 600 in FIG. 7A can cause client 340 to display GUI 700 in FIG. 7B. For example, as shown in FIG. 7A, user can interact with GUI 600 to provide a selection input 710 (e.g., a touch input) selecting display interactive element 628. Although the user selection is shown as occurring after supplemental information (e.g., supplemental information 426 of FIG. 4) has been added to GUI 600, it is to be understood that the selection can occur before supplemental information has been added.

GUI 700 can display all or a portion of a selected hit (e.g., email message 720 corresponding to selected interactive element 628) and/or all or some of the one or more other email messages (e.g., email message 730) that are related to the selected hit. In some instances, the email messages displayed in GUI 700 can be retrieved from local storage by client 340 in response to the user selecting interactive element 628. If the email messages displayed in GUI 700 are not already in local storage, client 340 can obtain them from message management service 300 in response to a user request to display a hit. For example, as described above with reference to FIG. 4, client 340 can receive email message 720 and email message 730 in retrieval response 436 provided by message management service 300.

The number of email messages presented in GUI 700 can be based on the display size of client 340. In some embodiments, a portion of each email message can be displayed to maximize a number of emails that can be displayed at one time in GUI 700. In the event that additional emails cannot be displayed, GUI 700 can include an interactive element, such as an additional results control 740 that enables a user to request client 340 to modify GUI 700 to display other email messages (e.g., email messages related to email message 720) that are not shown, or additional content for email messages 720, 730 that are partially shown. Additionally, GUI 700 can include an interactive element, such as a return control 750 that enables a user to request client 340 to return to a display of results, such as GUI 600.

FIGS. 8A and 8B each show a GUI of a client to display email messages according to some embodiments of the present invention. FIG. 8A illustrates GUI 600 shown in FIG. 6B. FIG. 8B shows GUI 800, which corresponds to GUI 600 after being updated with descriptive information identifying new results for new email messages that satisfy a search based on query provided by input 610 of FIG. 6A.

In this example, client 340 can update a display interactive element to provide updated information when new results (e.g., new result 542 or new result 560 of FIG. 5) are received for a search. When new results are received, client 340 can automatically update GUI 800 to display the new results. GUI 800 can be updated to display new result according to an order (e.g., an order based on time and/or date) in which results are presented in GUI 600. For example, if a new email is a hit, a new display interactive element 830 can be displayed at the top of a list of results in GUI 800 (assuming the hits are displayed in an order based on time of receipt). In generating GUI 800, client 340 may remove results to accommodate display of new results within constraints of display for client 340. For example, to present display interactive element 830, display interactive element 628 can be removed from GUI 800 because in this example, GUI 800 can display at most five results at a given time. If needed, a user can interact with GUI 800 to display more results.

In some embodiments, GUI 800 can also be updated if a new email message alters a supplemental response, such as supplemental response 562. For example, descriptive information 622 can be updated to reflect a change in thread count 810 from four to five when a supplemental response 562 is received for the email message represented by descriptive information 622. This can occur, for example, if a new email message is received in a thread that includes at least one search hit.

By automatically updating a GUI with new results, a user can be provided with new results quickly as soon as they are received and discovered. As a result, a user can more easily identify results for a search without having to regularly issue a new search request to obtain new results.

Figure 9:
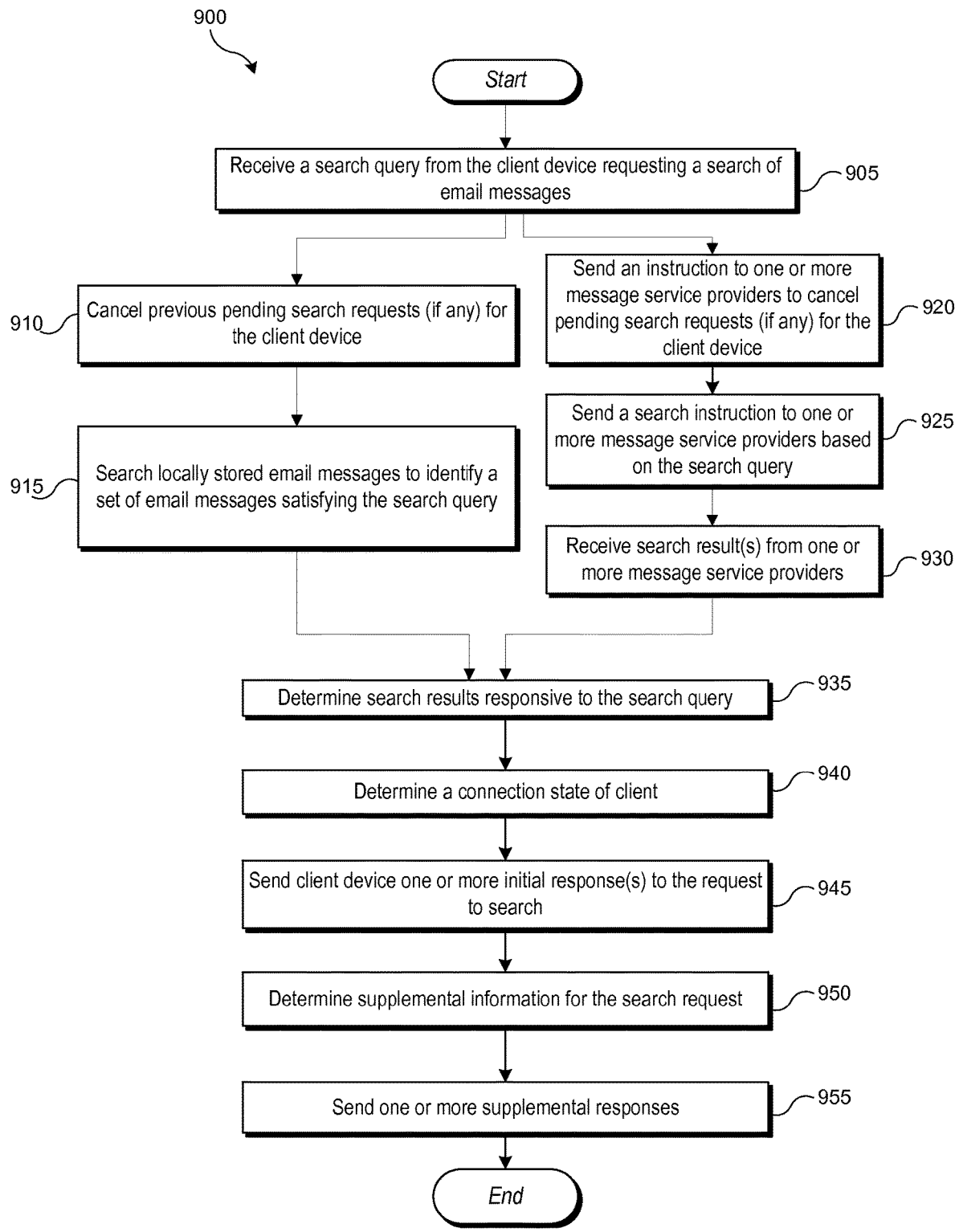
FIG. 9 is a flow diagram of a process for search and retrieval of messages according to some embodiments of the present invention.

FIG. 9 is a flow diagram of a process 900 for search and retrieval of messages according to some embodiments of the present invention. Process 900 can be implemented, e.g., by message management service 300 of FIG. 3.

Beginning at block 905, process 900 can receive a search query from a client device requesting a search of a corpus of email messages for an email account. The corpus of email messages can include email messages stored for the email account at an email service provider that maintains the email account. For example, message management service 300 can receive search request 402 requesting a search of email messages stored for an account at messaging service 108. In some embodiments, search request 402 can include client metadata that indicates one or more accounts (e.g., email accounts) to be search for email messages.

In some embodiments, search request 402 can include a search identifier (search ID), which can uniquely identify a search request received from a particular client. The search ID can be a unique value generated by client 340 for the search request. The search ID can be based on a timestamp or time information when the request is communicated to message management service 300. In some embodiments, message management service 300 can generate the search ID to uniquely identify a search request received from client 340. Message management service 300 can store the search ID in association with information identifying client device 340. In some embodiments, the search ID can be stored in association with a time stamp or other information indicating an order that identifies when a search request is received.

Message management service 300 can include the search ID with responses to client 340 to enable client 340 to match a response with a corresponding search request to enable results to be presented with the correct search request. Message management service 300 can also use search ID to identify a current search request received from a particular client, such as client 340. Message management service 300 can use the search ID to determine when a search request was received. Such information can be used to determine whether to cancel previous (e.g., older) search requests. Further details about use of the search ID are described below.

In some embodiments, connection state information can be included with the search query received from client 340. The connection state information can indicate a type of connection, such as a cellular data network connection, a Wi-Fi connection, etc. The connection state information can be used to determine a number of responses and/or an amount of content to include in responses to a search request. Use of the connection state is described below.

Process 900 can perform multiple different searches to locate email messages that satisfy the search query. Using a first technique, process 900 can search (e.g., search 412 of FIG. 4) local storage of message management service 300 to determine email messages that satisfy the search query. In some embodiments, before a search is conducted of message management service's 300 local storage, process 900, at block 910, can cancel previous search requests, if any are pending, for client 340 which sent a search request. For example, process 900 can cancel previous search requests sent by a client to search a particular email account. By canceling previous search requests, message management service 300 can improve performance for processing only the current search request. A reduction in search processing time can contribute to an reduction in response time for communicating results of the search request to the client.

In some embodiments, message management service 300 can determine whether previous search requests are being processed for a particular client by determining whether it stores a search ID for a previous search request that is currently being processed. Message management service 300 can search its storage to identify existing search IDs, each of which can be stored with or used to indicate a timestamp indicating an existence of a search request that is being processed and when the search request was received. Thus, message management service 300 can identify older, or previous search IDs for cancellation.

At block 915, process 900 can search locally stored email messages (e.g., a local cache of email messages) for the email account to identify a set of email messages that satisfy the search query. Message management service 300 can search locally stored email messages (e.g., email messages 352 of FIG. 3) that were previously received from messaging service 108.

Process 900 can also locate email messages that satisfy the search query by communicating with one or more message service providers (e.g., messaging service 108) to search for email messages for an account. Before communicating with a message service provider, process 900 can proceed to block 920, where process 900 sends an instruction to each message service provider to be searched to cancel previous searches for a client (that requests a search at 905).

At block 925, process 900 can send a search instruction to one or more message service providers based on the search query received from the client. For example, message management service 300 can instruct messaging service 108 to search for email messages that satisfy the search query. The instruction can identify one or more accounts to search for email messages. In some embodiments, message management service 300 can select a message service provider to receive a search instruction based on which accounts are to be searched At block 930, process 900 can receive one or more search results from one or more message service providers. For example, message management service 300 can receive search results 414 from messaging service 108 as described above. Search results from a different message service provider can be received concurrently or at different times.

In some embodiments, process 900 can concurrently perform multiple techniques for searching for email messages. For example, message management service can search locally stored email messages, at block 915, concurrently with sending a request to messaging service 108 to search for email messages. Searching concurrently can enable message management service 300 to reduce an amount of time for searching for email messages, thereby enabling message management service 300 to reduce a response time for communicating results to a client.

In some embodiments, at block 935, process 900 can determine search results responsive to the query using the search results received from one or more message service providers and/or the search results determined from a search of local storage. In some embodiments, because local storage can be searched concurrently with a search by one or more message service providers, results from both searches can be received before results are communicated to requesting client. In such embodiments, process 900 can determine the search results by merging search results from a search of local storage and search results received from a search conducted by one or more message service providers. Merging the email messages can include performing deduplication to remove duplicate messages identified by both message management service 300 and messaging service 108. In some embodiments, determining the search results responsive to the query can include determining an order of the search results. For example, the order can be based on time and/or date.

At block 940, process 900 can determine a connection state of client 340 based on connection state information maintained by message management service 300. The connection state information can include a status of a communication connection between client 340 and message management service 300, a type of communication connection, a bandwidth, or other measures of connectivity.

At block 945, process 900 can send one or more initial responses to the client. For example, message management service 300 can send one or more initial responses 416, 420 based on the set of email messages that satisfy the search query. As described above, an initial response can contain information descriptive of each email message in a set of email messages. In each initial response, message management service 300 can include a search ID of the search query to which the initial response is directed. The search ID enables client 340 to correctly match results with a search query generated by client 340.

In some embodiments, process 900 can send multiple initial responses to a query. For instance, if results from a local search by message management service 300 and a response from messaging service 108 to a search request are received at different times, message management service 300 can send results and results from messaging service 108 as separate initial responses. example, message management service 300 can generate one or more initial responses, such as initial response 416, based on local search 412 before message management service 300 receives search results 414 from messaging service 108 for search request 410. Additionally, in some embodiments, message management service 300 can determine a number of initial responses to send based on the connection state of client device 340. For example, based on a bandwidth of the communication connection between client 340 and message management service 300, process 900 can determine a number of email messages for which descriptive information (e.g., a descriptor) is to be included in the initial response. In some embodiments, when the communication connection is slow or has low bandwidth, message management service 300 can reduce the frequency of sending initial responses and/or the number of email messages for which descriptors are included in each initial response. When the communication connection is fast or has high bandwidth, message management service 300 can increase the frequency of sending initial responses and/or the number of email messages for which descriptors are included in each initial response. By dynamically determining the amount of information to communicate and/or the frequency at which to communicate such information, message management service 300 can optimize delivery of initial responses to client 340, thereby reducing delay for communication of initial responses 416, 420.

At 950, process 900 can determine supplemental information for some or all of the hits. For example, message management service 300 can determine supplemental information to be included in a supplemental response 424. As described above, a supplemental response can include any information about a particular hit that was not included in the initial response in which the hit was reported to client 340. For example, supplemental response 424 can include information indicating that one or more other email messages are related to an email message in an initial response.

At 955, process 900 can send one or more supplemental responses including the supplemental information. For example, message management service can send supplemental responses 424 that include supplemental information 426. In some embodiments, a supplemental response can be sent immediately after an initial response to enable the client to receive the supplemental information before or immediately after information in an initial response is displayed. In other embodiments, a supplemental response that includes information about a given hit can be sent at any time after sending the initial response that includes the hit. Process 900 can end after block 955.

In some embodiments, after sending one or more initial responses at block 945, process 900 can return to one or both of block 920 (e.g., search 554) or block 925 (e.g., send search request 550) to conduct subsequent searches to identify new results for email messages received after an initial response is sent at block 945. Process 900 can return to block 920 and/or block 925 periodically or intermittently. After conducting a subsequent search at one or both of block 920 or block 925, process 900 can proceed to blocks 935, at which process 900 can determine a set of email messages for results determined for block 920 and/or block 930. Process 900 can determine a connection state of a client at block 940 and can send client 340 one or more initial responses (e.g., initial response 558) at block 945 and one or more supplemental responses (e.g., supplemental responses 562) at block 955 for new email messages identified in the one or more initial responses.

It will be appreciated that process 900 is illustrative and that variations and modifications are possible. Steps described as sequential may be executed in parallel, order of steps may be varied, and steps may be modified, combined, added or omitted.

By implementing process 900 or similar processes, a message management service can improve performance for search and retrieval of email messages from a message service provider. A response time for providing results responsive to a query can be reduced by sending multiple initial responses and/or by adjusting, based on available bandwidth, the amount of information included in an initial response. Reducing the amount of data communicated (e.g., communicating descriptors rather than entire email messages) can reduce a response time for providing results for a search request. By providing supplemental responses including supplemental information for results, a client can present additional context for an email message that may assist the user in quickly finding information.

Figure 10:
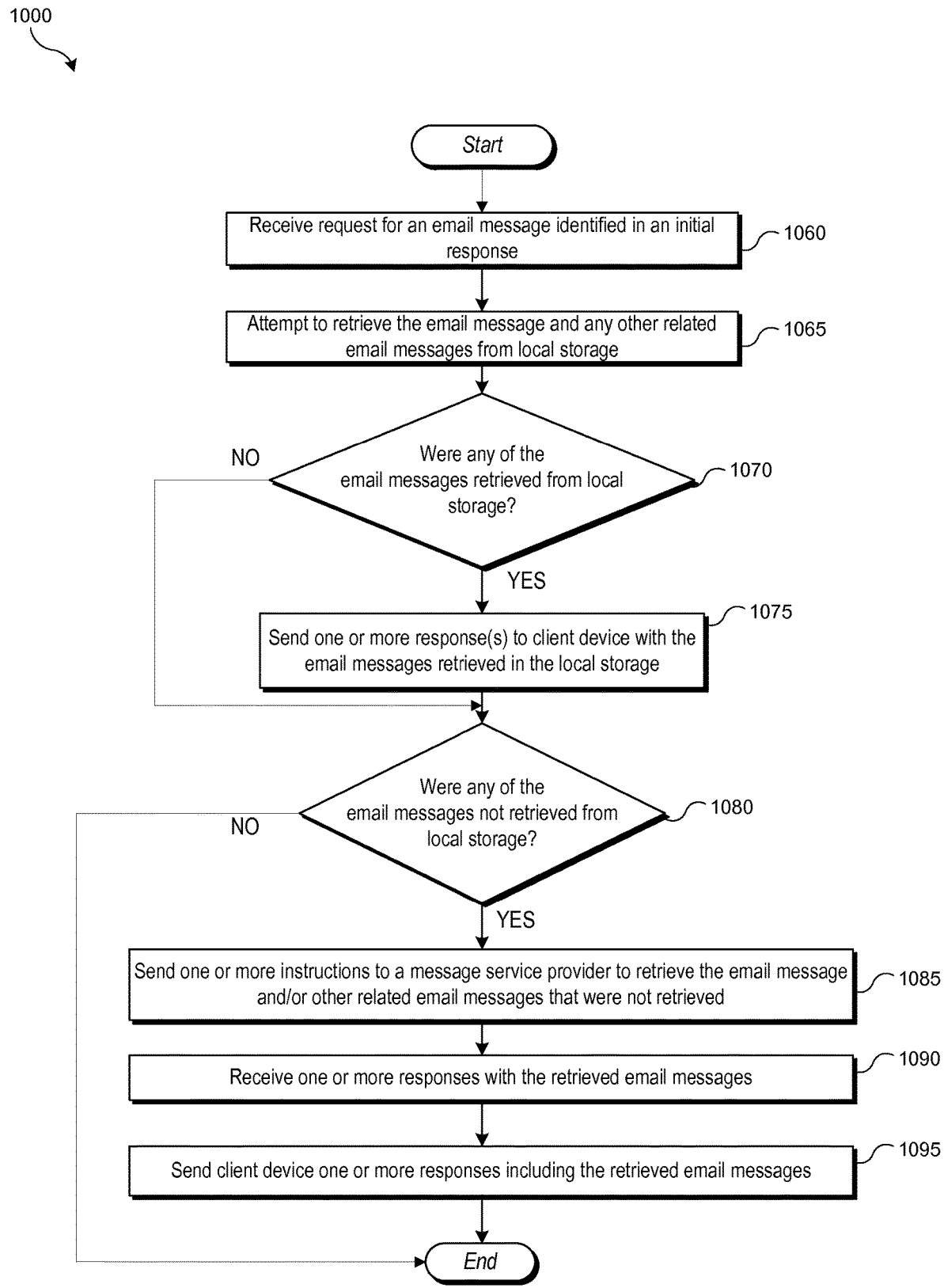
FIG. 10 is a flow diagram of a process for search and retrieval of messages according to some embodiments of the present invention.

FIG. 10 is a flow diagram of a process 1000 for search and retrieval of messages according to an embodiment of the present invention. Process 1000 can be implemented by message management service 300 of FIG. 3 to retrieve an email message for a result determined by process 900 of FIG. 9.

Process 1000 can begin after message management service 300 has sent least one initial response to a search query to client 340 (e.g., after block 945 of process 900 of FIG. 9). At block 1060, process 1000 can receive a request for one or more email messages identified in an initial response.

At block 1065, process 1000 can attempt to retrieve the requested email message and other email messages related to the requested email message from storage local to the message management service. For example, message management service 300 can use the message ID included in retrieval request 432 to attempt to retrieve the requested email message from local data store 330. In some embodiments, message management service 300 can determine whether the requested email message is related to any other email messages, e.g., by association with a message thread.

Based on such a determination, message management service 300 can identify message IDs for each related email message, which it can then use to attempt to retrieve each related email message from local data store 330.

At block 1070, process 1000 can determine whether either or both of the requested email message or any other related email messages were retrieved from local storage. If process 1000 determines that at least one email message was retrieved from local storage, then process 1000 can proceed to block 1075. At block 1075, process 1000 can send one or more responses (e.g., retrieval response 436) to client 340. The one or more responses can include the email messages that were retrieved from local storage.

At block 1080, process 1000 can determine whether either or both of the requested email message or any other related email messages were not retrieved from local storage. If process 1000 determines that both the requested email message and any other related email messages were all found in local storage, process 1000 can end. If process 1000 determines that at least one email message responsive to the request was not found in local storage, process 1000 can proceed to block 1085.

At block 1085, process 1000 can send instructions to a message service provider (e.g., messaging service 108) to retrieve the requested email message and/or any other related email messages that were not retrieved from local storage. In some embodiments, the instructions can include a message ID of each of the requested email message and/or any other related email messages that were not retrieved from local storage. Messaging service 108 can retrieve an email message for each message ID included in an instruction.

At block 1090, process 1000 can receive one or more responses (e.g., retrieval response 442 of FIG. 4) from a message service provider. Each retrieval response can contain one or more of the email messages requested at block 1085.

At block 1095, process 1000 can send one or more responses (e.g., retrieval response 436 of FIG. 4) to client 340 that include the email messages received from the message service provider at block 1090. In some embodiments, process 1000 can send responses to the client as responses are received from the message service provider. Process 1000 can end after block 1095.

It will be appreciated that process 1000 is illustrative and that variations and modifications are possible. Steps described as sequential may be executed in parallel, order of steps may be varied, and steps may be modified, combined, added or omitted.

Figure 11:
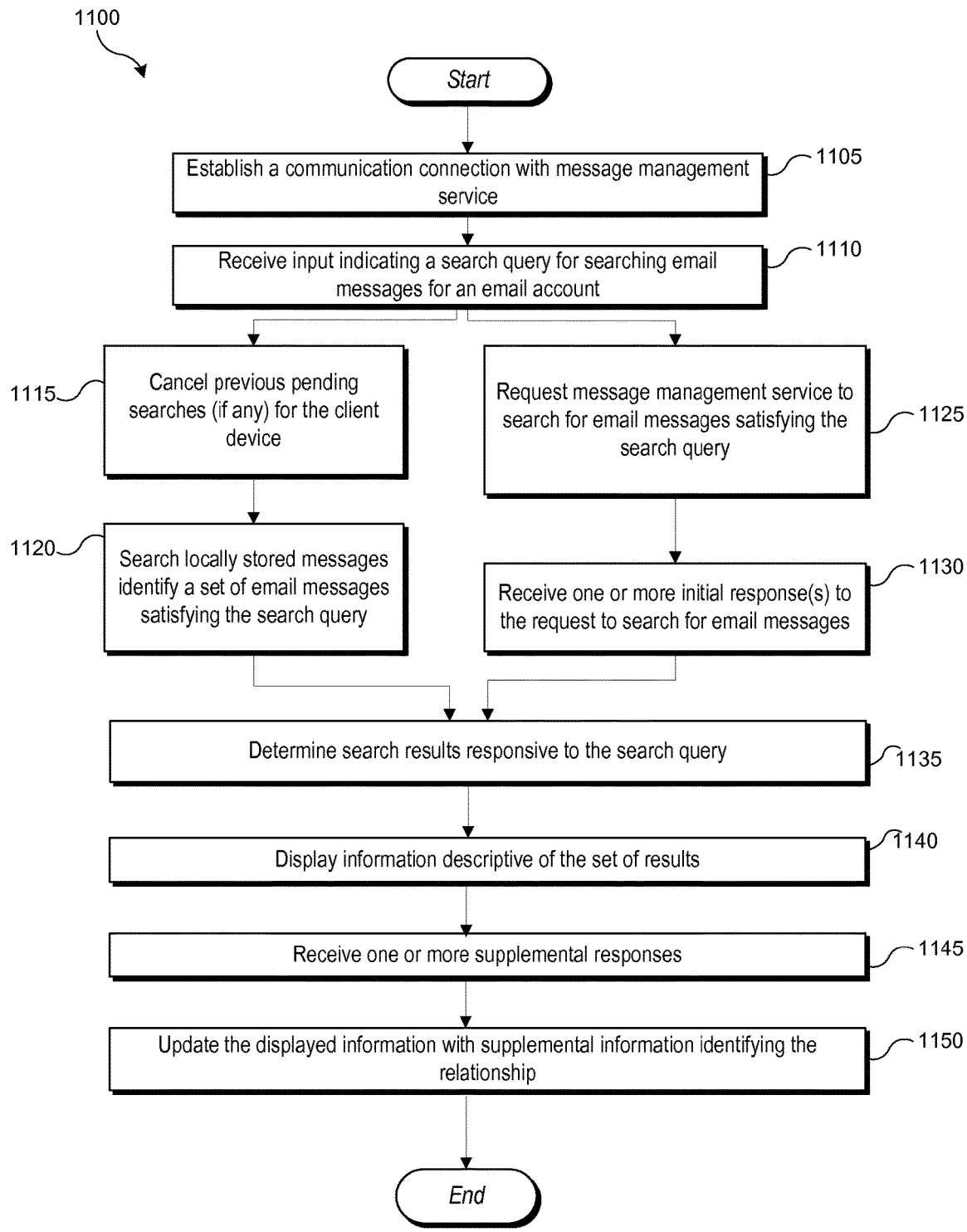
FIG. 11 is a flow diagram of a process for search and retrieval of messages according to an embodiment of the present invention.

FIG. 11 is a flow diagram of a process for search and retrieval of messages according to some embodiments of the present invention. Process 1100 can be implemented by a client, e.g., client 340 of FIG. 3.

Beginning at block 1105, process 1100 can establish a communication connection with message management service 300. To reduce processing time for a search request, client 340 can establish, or "prime," a communication connection before client 340 requests a search. In some embodiments, client 340 can establish a communication connection with message management service 300 in response to receiving input indicating that the user is likely to start entering a search query. For example, referring to FIG. 6A, a user may set the focus of GUI 600 to search box 610 (e.g., by tapping on it) prior to typing a query. In response to the user setting the focus to the search box, client 340 can establish a connection with message management service 300 rather than waiting until the user has already begun to enter a query.

In some embodiments, client 340 can maintain a communication connection between client 340 and message management service 300 during a period of inactivity at client 340. The period of inactivity can be based on a period of time (e.g., two minutes). Maintaining a connection for a period of time after a connection is established can improve performance for some searches, by eliminating time needed to re-establish a communication connection with message management service 300 before sending a search request.

At block 1110, process 1100 can receive input indicating a search query for searching for one or more email messages for an email account in satisfaction of the search query. For example, client 340 can receive search request 402 from user 450 based on input received from user 450. For example, referring to FIG. 6A, a user may begin typing a query into search box 610. A search query can be initiated when the user finishes typing or when the user has typed a minimum number of characters (e.g., at least three, five, or some other minimum number).

Process 1100 can perform one or more different searches to locate email messages that satisfy the search query. Using a first technique, process 1100 can search (e.g., search 408 of FIG. 4) local storage client 340 to determine email messages that satisfy the search query. In some embodiments, before a search is conducted of client's 340 local storage, process 1100, at block 1115, can cancel previous search requests, if any are pending, at client 340. For example, if a search is automatically initiated after a user enters a minimum number of characters, new searches can be initiated as new characters are typed and previous searches (which may have fewer characters in the query) can be canceled. By canceling previous search requests, client 340 can reduce or avoid processing delays that can occur when multiple search requests are being processed in parallel. An improvement in processing time can contribute to an improvement in response time for providing results to a user.

In some embodiments, client 340 can determine whether previous search requests are being processed by determining whether it stores a search ID for a previous search request that is currently being processed. Thus, client 340 can identify older, or previous search IDs for cancellation.

At block 1120, process 1100 can search locally stored email messages (e.g., a cache of email messages) for an email account to identify a set of email messages that satisfy the search query.

Process 1100 can also locate email messages that satisfy the search query by communicating with message management service 300 to search for email messages for an account. At block 1125, process 1100 can request (e.g., request 408 of FIG. 4) message management service 300 to search for email messages that satisfy the search query. The request can include an identifier of one or more email accounts to be searched.

As described above, in some embodiments, search request 404 can include a search ID, which can uniquely identify a search request received from a particular client. Also as explained above, in some embodiments, connection state information can be included with the search query received from a client, and this information can be used to determine a number of responses and/or an amount of content to include in responses to a search request.

At block 1130, process 1100 can receive one or more initial responses (e.g., initial response 416, 420) identifying search results from the message management service (e.g., message management service 300). Message management service 300 can perform a search, e.g., using process 900 described above or similar processes, and client 340 can receive initial responses from message management service 300 as search results are determined.

In some embodiments, process 1100 can concurrently perform local and remote searches for email messages. For example, client 340 can search locally stored email messages at 1120 concurrently with sending a request to message management service 300 to search for email messages. Searching concurrently can enable client 340 to reduce a response time for presenting results to a user.

In some embodiments, at block 1135, process 1100 can determine search results relevant to the query using the search results received from message management service 300 at block 1130 and/or the search results determined from a search of local storage at block 1120. In some embodiments, block 1135 can include merging search results from a search of local storage and search results received from message management service 300. Merging the results can include performing deduplication to remove email messages that were identified by both searches. In some embodiments, block 1135 can include determining an order of the results.

At block 1140, process 1100 can include displaying information descriptive of the set of email messages that are determined based on search results. For example, as shown in FIG. 6A, client 340 can present a display element for a descriptor associated with each result for the search query. Also as described earlier with reference to FIG. 6A, client 340 can display a particular number of email messages based on a variety of factors, such as display size of client 340 and/or the number of accounts searched.

At block 1145, process 1100 can receive one or more supplemental responses including supplemental information. For example, client 340 can receive supplemental responses 426 that include supplemental information 424 as described above.

At block 1150, process 1100 can update the displayed information about the search results with the supplemental information. For example, client 340 can update its display to present supplemental information as described above with reference to FIG. 6B. Process 1100 can end after block 1150.

It will be appreciated that process 1100 is illustrative and that variations and modifications are possible. Steps described as sequential may be executed in parallel, order of steps may be varied, and steps may be modified, combined, added or omitted. For instance, in some embodiments, process 1100 can initiate another search at block 1120 or at block 1125 to identify new results for email messages that have been received after receiving one or more initial responses at block 1130 and/or after searching local storage for email messages, at block 1120. After conducting a subsequent search at one or both of block 1120 or block 1125, process 900 can proceed to block 1135, at which process 1100 can determine search results new search results determined at block 1120 and/or block 1130.

Figure 12:
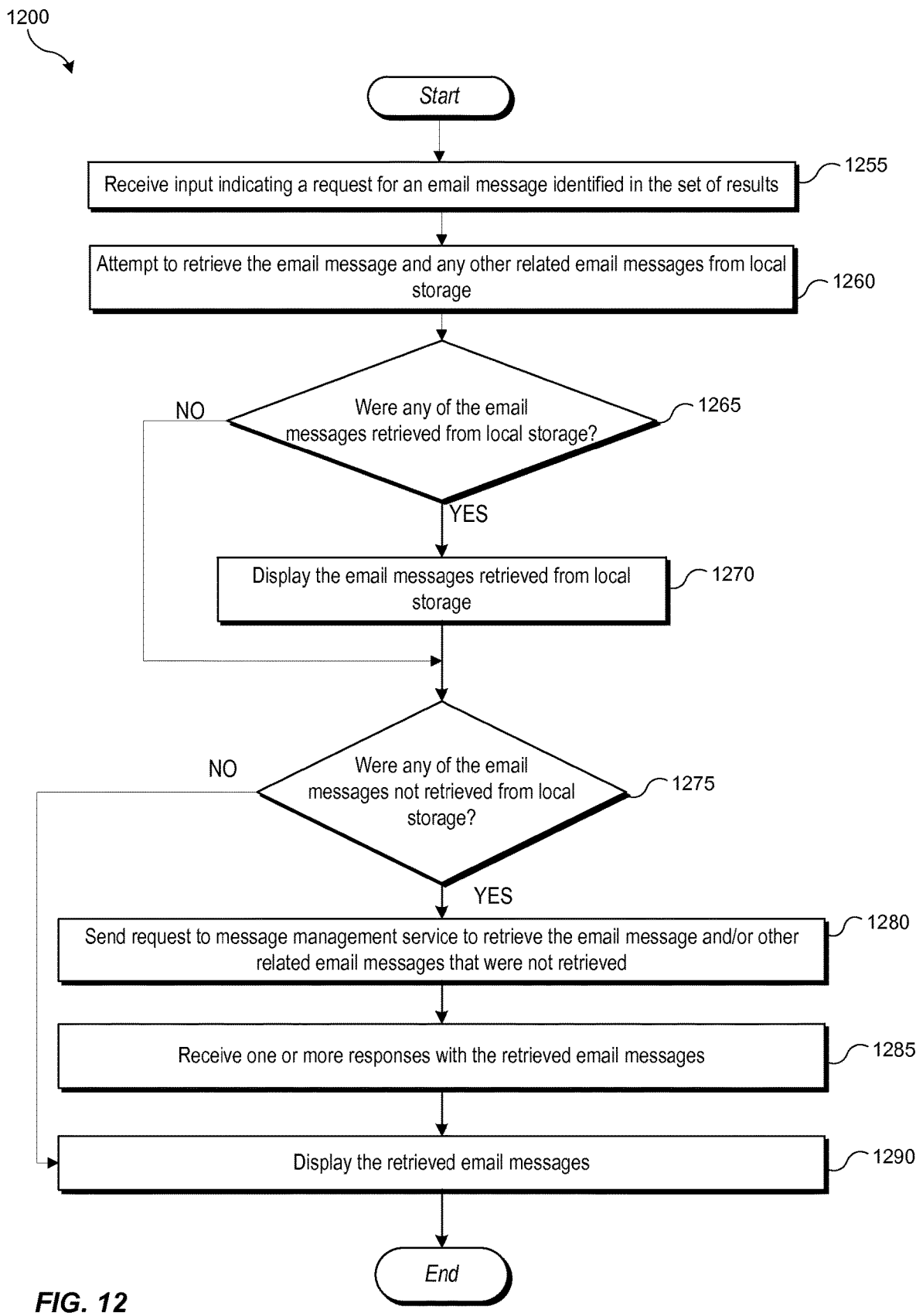
FIG. 12 is a flow diagram of a process for search and retrieval of messages according to an embodiment of the present invention.

FIG. 12 is a flow diagram of a process 1200 for search and retrieval of messages according to an embodiment of the present invention. Process 1200 can be implemented by client 340 of FIG. 3 to retrieve an email message for a result determined by process 1100 of FIG. 11.

Process 1200 can after client 340 has displayed at least some information descriptive of search hits (e.g., after block 1140 of process 1100 of FIG. 11). At block 1255, process 1200 can receive input (e.g., input gesture 710 of FIG. 7A) indicating a request (e.g., search request 402) for one or more email messages identified in the set of results that are displayed.

At block 1260, process 1200 can attempt to retrieve (e.g., retrieve 430) either or both of the requested email message or any other email messages related to the requested email message that located in local storage of client 340. For example, client 340 can use the message ID for a requested email message to check local storage to retrieve the requested email message. In some embodiments, client 340 can have thread information indicating whether the requested email messages is related to any other email messages by association with a message thread. In such embodiments, client 340 can identify message IDs for other related email message, which it can then use to check local storage to retrieve each related other email message.

At block 1265, process 1200 can determine whether either or both of the requested email message or any other related email messages were retrieved from local storage of client 340. If process 1200 determines that at least one email message was retrieved from local storage, then process 1200 can proceed to block 1270. At block 1270, process 1200 can display the email messages (e.g., retrieval results 438 of FIG. 4) retrieved from local storage. For example, client 340 can display email message 720 and/or email message 730 as shown in FIG. 7B if either or both of these email messages are retrieved from local storage.

At block 1275, process 1200 can determine whether either or both of the requested email message or any other related email messages were not found in local storage. If process 1200 determines that both the requested email message and any other related email messages were all found in local storage, process 1200 can proceed to block 1290. If process 1200 determines that at least one email message responsive to the request was not found in local storage, process 1200 can proceed to block 1280.

At block 1280, process 1200 can send a request (e.g., retrieval request 432) to message management service 300 to retrieve the requested email message and/or any other related email messages that were not retrieved from local storage. The request can include a search ID indicating that that the messages are being requested in connection with a specific search. In some embodiments, the request can include a message ID of each of the requested email message and/or any other related email messages, if known, that were not retrieved from local storage. Message management service 300 can retrieve the requested email message (and related messages if applicable), e.g., using process 1000 described above.

At block 1285, process 1200 can receive one or more responses (e.g., response 436 of FIG. 4) from message management service 300. Each response can contain one or more of the email messages requested at block 1280. The one or more responses 436 can include the search ID, and this can enable client 340 to recognize the email message as being responsive to a request for a search result.

At block 1290, process 1200 can display the email messages, including messages retrieved from local storage at block 1270 and/or any messages received from message management service 300 at block 1285. Client 340 can display email messages as described with reference to FIG. 7B. In some embodiments, client 340 can initially display messages retrieved from local storage (block 1270), then update the display as additional email messages are received from message management service 300.

While the invention has been described with respect to specific embodiments, one skilled in the art will recognize that numerous modifications are possible. While some embodiments described above may make reference to a message management system and to email messages in particular, a person of ordinary skill in the art with access to the present disclosure will recognize that the techniques described here in can be applied to can be applied to other types of messages (including instant messages, SMS and/or MMS messages, voice messages, photo/image messages, social network messages, etc.) and to other types of content managed by a content management system. Such content can include images, video, or audio. A descriptor of a content item can include information (metadata) about the media content, such as a name, a file size, a type of data, date created, date modified, or other information. Thread information included in supplemental responses can identify a relationship of content items. For example, media content items can have a relationship based on common values shared between fields in metadata of each media content item. A relationship of media content items can be identified based on common words, images, sounds, authors, or other type of metadata common amongst media content items.

Embodiments described above may make reference to data structures and databases or data stores. It is to be understood that these terms can encompass any techniques for organizing information into discrete records that can be stored, retrieved and interpreted by computer systems.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
receiving, at a server computer, a search query from a client device requesting a search of a corpus of messages for an account with a messaging service provider, wherein the corpus of messages includes messages stored for the account at the messaging service provider;
searching, by the server computer, the corpus of messages for the account to identify a set of messages that satisfy the search query;
sending, from the server computer, an initial response to the client device, the initial response including information descriptive of at least a first message in the set of messages;
identifying, by the server computer, information associated with the initial response, the information identifying a relationship of at least one message in the set of messages to at least one message not in the set of messages;
continuing, by the server computer, to search the corpus of messages for the account to identify one or more other messages related to the first message based at least on the identified information associated with the initial response;
determining, by the server computer, that the one or more other messages related to the first message exists based on the information associated with the initial response, wherein the one or more other messages are not identified by the search query; and
after sending the initial response, automatically sending, by the server computer, a supplemental response to the client device, the supplemental response including supplemental information indicating that the one or more other messages are related to the first message.

2. The method of claim 1, wherein the supplemental information comprises at least one of a folder identifier corresponding to one or more folders that contain the first message, a thread identifier corresponding to the first message in the initial response, a count of one or more messages related to the first message identified by the thread identifier, and a number of one or more attachments associated with a message thread of the first message.

3. The method of claim 1 further comprising:
sending, to the messaging service provider, a request for the first message;
receiving, from the messaging service provider, the first message; and
sending to the client device a response including the first message.

4. The method of claim 1 wherein information descriptive of the first message includes a message identifier of the first message, a subject of the first message, and a portion of a body of the first message.

5. The method of claim 1 further comprising:
sending, by the server computer to the client device, a new initial response including information descriptive of a new message that satisfies the search query, wherein the new message is received by the messaging service provider after the initial response is sent.

6. The method of claim 1 wherein identifying the one or more other messages as being related to the first message includes:
accessing thread information stored at the server computer to identify a thread of messages that includes the first message; and
identifying each other message in the thread as being related to the first message.

7. The method of claim 6 wherein the supplemental response includes a thread identifier of the thread and an indicator of a number of messages in the thread.

8. The method of claim 1 further comprising:
after the initial response has been sent to the client device, receiving a request from the client device for the first message;

retrieving the first message and the one or more other messages related to the first message; and sending the first message and the one or more other messages to the client device to be displayed.

9. A server system comprising:
a processor; and
a memory having programming instructions stored thereon, which, when executed by the processor, perform operations, comprising:
receiving a search query from a client device requesting a search of a corpus of messages for an account with a messaging service provider, wherein the corpus of messages includes messages stored for the account at the messaging service provider;
searching the corpus of messages for the account to identify a set of messages that satisfy the search query;
sending an initial response to the client device, the initial response including information descriptive of at least a first message in the set of messages;
identifying information associated with the initial response, the information identifying a relationship of at least one message in the set of messages to at least one message not in the set of messages;
continuing to search the corpus of messages for the account to identify one or more other messages related to the first message based at least on the identified information associated with the initial response;
determining that the one or more other messages related to the first message exists based on the information associated with the initial response, wherein the one or more other messages are not identified by the search query; and
after sending the initial response, automatically sending a supplemental response to the client device, the supplemental response including supplemental information indicating that the one or more other messages are related to the first message.

10. The server system of claim 9, wherein the operations further comprise:
prior to sending the initial response, deduplicating the first message and the set of messages.

11. The server system of claim 9 wherein the search query requests the search of a plurality of accounts.

12. The server system of claim 11 wherein different ones of the plurality of accounts are maintained by different ones of a plurality of messaging service providers.

13. The server system of claim 12 wherein the operations further comprise:
receiving separate search results from different ones of the plurality of messaging service providers, wherein each of the separate search results identifies a different set of messages that satisfies the search query; and
sending a separate initial response to the client device corresponding to each of the separate search results.

14. The server system of claim 9 wherein the operations further comprise:
determining whether a previous search query requesting a different search of the corpus of messages for the account was received; and
canceling an in-progress search for the previous search query in response to determining that the previous search query requesting the different search was received.

15. The server system of claim 9 wherein the operations further comprise:
receiving a request for a particular message identified in the initial response or the supplemental response;

determining whether the corpus of messages has the particular message;
sending an instruction to the messaging service provider to retrieve the particular message in the event that the corpus of messages does not have the particular message; and
sending the client device the particular message.

16. The server system of claim 9, wherein the supplemental information comprises at least one of a folder identifier corresponding to one or more folders that contain the first message, a thread identifier corresponding to the first message in the initial response, a count of one or more messages related to the first message identified by the thread identifier, and a number of one or more attachments associated with a message thread of the first message.

17. The server system of claim 9, wherein the operations further comprise:
after the initial response has been sent to the client device, receiving a request from the client device for the first message;
retrieving the first message and the one or more other messages related to the first message; and
sending the first message and the one or more other messages to the client device to be displayed.

18. A non-transitory computer-readable storage medium having stored thereon executable instructions that, when executed by one or more processors of a computer system, cause the computer system to execute a method comprising:
receiving a search query from a client device requesting a search of a corpus of messages for an account with a messaging service provider, wherein the corpus of messages includes messages stored for the account at the messaging service provider;
searching the corpus of messages for the account to identify a set of messages that satisfy the search query;
sending an initial response to the client device, the initial response including information descriptive of at least a first message in the set of messages;
identifying information associated with the initial response, the information identifying a relationship of at least one message in the set of messages to at least one message not in the set of messages;
continuing to search the corpus of messages for the account to identify one or more other messages related to the first message based at least on the identified information associated with the initial response;
determining that the one or more other messages related to the first message exists based on the information associated with the initial response, wherein the one or more other messages are not identified by the search query; and
after sending the initial response, automatically sending a supplemental response to the client device, the supplemental response including supplemental information indicating that the one or more other messages are related to the first message.

19. The non-transitory computer-readable storage medium of claim 18, wherein the method further comprises:
after the initial response has been sent to the client device, receiving a request from the client device for the first message in the set of messages;
retrieving the first message and the one or more other messages related to the first message; and
sending the first message and the one or more other messages to the client device to be displayed.

* * * * *